(12) United States Patent
Liang et al.

(10) Patent No.: US 9,191,939 B2
(45) Date of Patent: Nov. 17, 2015

(54) METHOD AND USER EQUIPMENT FOR MAPPING ACK/NACK RESPONSE MESSAGES

(75) Inventors: Chunli Liang, Shenzhen (CN); Bo Dai, Shenzhen (CN); Weiwei Yang, Shenzhen (CN); Peng Zhu, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 167 days.

(21) Appl. No.: 13/824,365

(22) PCT Filed: Jun. 30, 2011

(86) PCT No.: PCT/CN2011/076711
§ 371 (c)(1),
(2), (4) Date: Mar. 17, 2013

(87) PCT Pub. No.: WO2012/041101
PCT Pub. Date: Apr. 5, 2012

(65) Prior Publication Data
US 2013/0170407 A1     Jul. 4, 2013

(30) Foreign Application Priority Data

Sep. 28, 2010  (CN) .......................... 2010 1 0503361

(51) Int. Cl.
*H04J 3/24*          (2006.01)
*H04W 72/04*      (2009.01)
*H04L 1/16*          (2006.01)
(Continued)

(52) U.S. Cl.
CPC ............... *H04W 72/042* (2013.01); *H04L 1/06* (2013.01); *H04L 1/1607* (2013.01); *H04L 5/001* (2013.01); *H04L 5/003* (2013.01)

(58) Field of Classification Search
CPC ........ H04L 5/14; H04L 5/1423; H04Q 11/04; H04J 1/10
USPC ................. 370/276, 277, 279, 281, 294, 295
See application file for complete search history.

(56) References Cited

U.S. PATENT DOCUMENTS

2012/0039407 A1\* 2/2012 Tiirola et al. ................. 375/260
2012/0113944 A1\* 5/2012 Yang et al. .................... 370/329

FOREIGN PATENT DOCUMENTS

CN       101594211 A    6/2009
CN       101594211 A    12/2009
(Continued)

OTHER PUBLICATIONS

P.R. China, State Intellectual Property Office, International Search Report for International Application No. PCT/CN2011/076711, mailed Oct. 20, 2011.
(Continued)

*Primary Examiner* — Brenda H Pham
(74) *Attorney, Agent, or Firm* — Bright IP Law Offices

(57) ABSTRACT

The present invention provides a method and a user UE for mapping ACK/NACK response messages. The method comprises the UE determining a number L of bits of ACK/NACK response messages according to predetermined conditions, wherein, the predetermined conditions include at least one of: a number of downlink component carriers or cells that are allocated to the UE by a base station, and a transmission mode of each of the downlink component carriers; and the UE mapping the ACK/NACK response messages to the L bits so as to handle them correctly.

14 Claims, 13 Drawing Sheets

(51) Int. Cl.
*H04L 5/00* (2006.01)
*H04L 1/06* (2006.01)

(56) References Cited

FOREIGN PATENT DOCUMENTS

| CN | 101771520 A | 7/2010 |
|---|---|---|
| CN | 101958778 A | 1/2011 |
| WO | 2010091165 A2 | 8/2010 |

OTHER PUBLICATIONS

3GPP, TSG RAN WG1 #54, Way forward on TOO PUCCH multi-bit ACKINACK transmission, by Texas Instruments, Huawei, CATT, Ericsson, Nokia, NSN, ZTE, South Korea, Aug. 18-22, 2008.
3GPP TSG RAN WG1 #62, Further details of ACK/NACK selection method, by LG Electronics, Madrid, Spain Aug. 23-27, 2010.
3GPP TSG RAN WG1 Meeting #60, UL ACK/NACK Transmission Design in TOO with CA, by CATT, San Francisco, USA, Feb. 22-26, 2010.
3GPP TSG RAN WG1 Meeting #60, UL ACK/NACK Transmission Design in FDD with CA, by CATT, San Francisco, USA, Feb. 22-26, 2010.
3GPP TSG RAN WG1 #62, Details for A/N transmission based on DFT-s-OFDM, by ZTE, Madrid, Spain Aug. 23-27, 2010.
3GPP TSG RAN WG1 #62, Evaluation of UL ACKINAK Bundling Ways in LTE•A TOO, by Nokia, Nokia Siemens Networks, Madrid, Spain Aug. 23, 27, 2010.
3GPP TSG RAN WG1 #62, ACK/NACK bundling in LTE-A, by ZTE, Madrid, Spain Aug. 23-27, 2010.
3GPP TSG RAN WG1 #62, Discussion on ACKINAK Full Bundling in LTE-A Too, by ASUSTeK, Madrid, Spain Aug. 23-27, 2010.
3rd Generation Partnership Project; Technical Specification Group Radio Access Network; Multiplexing and channel coding (FOD) (Release 9), 3GPP TS 25.212 V9.2.0 (Mar. 2010).

\* cited by examiner though the code word can detect the error. In OFDM (short for Orthogonal Frequency Division Multiplex) systems, ACK/NACK (short for Acknowledgement/Negative-acknowledgement) messages are used to indicate ACK/NACK transmissions, thereby deciding whether repeating is necessary.

METHOD AND USER EQUIPMENT FOR MAPPING ACK/NACK RESPONSE MESSAGES

CROSS REFERENCE TO RELATED APPLICATIONS

This application is the U.S. National Stage of International Patent Application No. PCT/CN2011/076711 filed on Jun. 30, 2011, which claims priority to Chinese Patent Application No. 201010503361.X filed on Sep. 28, 2010. Both the PCT Application and Chinese Application are hereby incorporated by reference in their entirety.

TECHNICAL FIELD

The present invention relates to the field of communication, and specifically, to method and user equipment for mapping ACK/NACK response messages.

BACKGROUND ART

In the HARQ (short for Hybrid Automatic Repeat Request) mode, the code word sent by a sending terminal can not only detect error but also have certain error correcting capability. After receiving the code word, the decoder of a receiving terminal first detects error situation, and then automatically corrects error if the situation is within the error correcting capability of the code word, or the receiving terminal sends a decision signal to the sending terminal via a feedback channel and requires the sending terminal to re-transmit information if there are too many errors and the situation is beyond the error correcting capability of the code word while the code word can detect the error. In OFDM (short for Orthogonal Frequency Division Multiplex) systems, ACK/NACK (short for Acknowledgement/Negative-acknowledgement) messages are used to indicate ACK/NACK transmissions, thereby deciding whether repeating is necessary.

In LTE (short for Long Term Evolution) systems, the ACK/NACK response messages can be separately sent on a PUCCH (short for Physical Uplink Control Channel), and can also be sent on a PUSCH (short for Physical Uplink Shared Channel) together with data.

In FDD (short for Frequency Division Duplex) systems, as uplink subframes correspond to downlink subframes one by one, when a PDSCH (short for Physical Downlink Shared Channel) only contains one code word stream, a UE (short for User Equipment) needs to feed back a 1-bit ACK/NACK response message, when the PDSCH contains two code word streams, the UE needs to feed back a 2-bit ACK/NACK response message, when the UE does not have PUSCH for sending in a current subframe, the UE will use a format 1a/1b on the PUCCH to send the 1/2 bit ACK/NACK response message; when the UE has the PUSCH for sending in the current subframe, the UE will subject the information of 1/2 bit to mapping from a certain ACK/NACK state to corresponding bit, channel coding, scrambling and modulating, then multiplex it with data and send them on the PUSCH.

In TDD (short for Time Division Duplex) systems, as uplink subframes do not correspond to downlink subframes one by one, that is, the ACK/NACK response messages corresponding to multiple downlink subframes need to be sent on the PUCCH/PUSCH of one uplink subframe, wherein the downlink subframes corresponding to the uplink subframes are integrated to form a bundling window. In the LTE TDD, two ACK/NACK transmissions modes are defined, which will be described hereinafter respectively.

One is an ACK/NACK bundling method, and the basic idea of this method is to subject the ACK/NACK messages of the code word streams that correspond to respective downlink subframes and need to be fed back in the uplink subframe to logical AND operation, if the PDSCH transmission of one downlink subframe contains two code word streams, the UE will feed back a 2-bit ACK/NACK response message that has been subjected to subframe logical AND operation and corresponds to each of the code word streams, if the PDSCH transmission of the respective subframes only contains one code word stream, the UE will feed back a 1-bit ACK/NACK response message that has been subjected to subframe logical AND operation and corresponds to the code word stream, when the UE does not have PUSCH for sending in a current subframe, the UE will use a format 1a/1b on the PUCCH to send the 1/2 bit ACK/NACK response message; when the UE has the PUSCH for sending at the current subframe, the UE will subject the information of 1/2 bit to channel coding and channel interleaving, then multiplex it with data and send them on the PUSCH.

The other is an ACK/NACK multiplexing method, in this method, an ACK/NACK response message will be fed back to each of the downlink subframes, and multiple ACK/NACK response messages should be fed back corresponding to multiple subframes, and when the PDSCH transmission of a certain downlink subframe contains 2 code word streams, the ACK/NACK response message of each of the code word streams will be first subjected to logical AND operation, and finally each downlink subframe only correspond to one ACK/NACK response message. When the UE does not have PUSCH for sending on a current subframe, the UE will use a format 1b with channel selection on the PUCCH to send the multiple ACK/NACK response messages. This method can carrier at most 4 bits of ACK/NACK response messages by combining channel selection with PUCCH format 1b. In addition, for different numbers of ACK/NACK, the LTE TDD defines a mapping table of different ACK/NACK states to modulation symbols sent at a selected PUCCH channel in format 1b. When the current UE has PUSCH for sending in the current subframe, the UE will subject the multiple bits of information to mapping from a certain ACK/NACK state to corresponding bit, channel coding and channel interleaving, then multiplex it with data and send them on the PUSCH. The number of the ACK/NACK that the UE needs to feed back at each subframe is decided by the uplink/downlink subframes configuration of the system.

The UE is configured by the higher layer signaling whether the UE uses the ACK/NACK bundling or the ACK/NACK multiplexing to feed back the ACK/NACK.

To meet requirements of the ITU-Advanced (short for International Telecommunication Union-Advanced), as an evolution standard of the LTE, the LTE-A (short for Long Term Evolution Advanced) system needs to support a wider system bandwidth (up to 100 MHz) and should also be backward compatible with the current standards of the LTE. Based on the current LTE systems, the bandwidths of the LTE systems can be combined to obtain a wider bandwidth, and this technology is called a CA (short for Carrier Aggregation) technology, which can improve the spectrum efficiency of an IMT-Advance system, relieve the lack of spectrum resources and thus optimize the use of spectrum resources.

When the LTE-A uses the CA technology, and when a base station configures multiple downlink component carriers, the UE needs to feed back the ACK/NACK response messages of the code word streams corresponding to the multiple downlink component carriers. In the LTE-A, when the ACK/NACK response message is sent on a PUCCH, two feedback manners are defined: using PUCCH format 1b with channel selection, and a feedback manner based on DFT-s-OFDM.

As described above, for the method using the PUCCH format 1b with channel selection, for different ACK/NACK feedback numbers, the corresponding mapping tables are different, and in one mapping table, different order of the ACK/NACK response messages are different will result in different selected channel and modulation symbol for final feedback. Currently, in the discussion of the LTE-A, the corresponding relationship between the ACK/NACK response messages of the code word streams corresponding to the downlink component carriers and the HARQ-ACK states in the mapping tables is still under discussion.

For the method based on DFT-s-OFDM, for different ACK/NACK feedback numbers, the mappings from corresponding ACK/NACK states to corresponding bits are also different. Moreover, for the number of the ACK/NACK that the UE needs to feed back, the UE has an agreed relationship with the base station. Currently a supposed work of the LTE-A is that the ACK/NACK fed back by the UE is determined according to the configured downlink component carriers and the transmission mode of each of the downlink component carriers. For example, if a base station configures 3 carriers for a terminal and the 3 carriers are all configured at an MIMO mode, the UE needs to feed back an ACK/NACK response message of (3×2=6) bits. However, currently there is no any detailed solution for the mapping relationship between the 6-bit information as fed back and each configured component carrier.

Therefore, if the mapping relationship between the ACK/NACK response messages and the bits as fed back or the corresponding relationship between the ACK/NACK response messages and the HARQ-ACK states in the mapping tables are understood in different ways at the base station and the terminal, the base station understands the ACK/NACK response messages fed back by the UE in a wrong way, and then error is incurred.

SUMMARY OF THE INVENTION

The primary purpose of the present invention is to provide method and user equipment for mapping ACK/NACK response messages, to at least solve the above problem.

According to one aspect of the present invention, a method for mapping ACK/NACK response messages is provided, comprising: a user equipment (UE) determining a number L of bits of ACK/NACK response messages according to predetermined conditions, wherein, the predetermined conditions include at least one of: a number of downlink component carriers or cells that are configured to the UE by a base station, and a transmission mode of each of the downlink component carriers; and the UE mapping the ACK/NACK response messages to the L bits.

In an FDD system, the UE is configured to determine the number L of the bits of the ACK/NACK response messages according to the number of the downlink component carriers or cells that the base station configured for the UE and the transmission mode of each of the downlink component carriers; and the UE is configured to map the ACK/NACK response messages to the corresponding L bits according to either an order of code word streams first and then downlink component carriers or cells or an order of downlink component carriers or cells first and then code word streams.

The bit number $$L = \sum_{i=0}^{M-1} x_i,$$

i=0, 1, . . . , M−1, wherein, M is a number of the downlink component carriers or cells that the base station configures for the UE, $x_i$ is a number of bits of the ACK/NACK response messages required by the transmission mode of a respective downlink component carrier or cell allocated for the UE, and $x_i$ is 1 if the transmission mode of a downlink component carrier contains 1 code word stream, and $x_i$ is 2 if the transmission mode of the downlink component carriers contains 2 code word streams.

In a TDD system, the UE is configured to determine the number L of the bits of the ACK/NACK response messages according to the number of the downlink component carriers or cells that the base station configured for the UE, a ratio of uplink subframes and downlink subframes configured for the UE and the transmission mode of each of the downlink component carriers; and the UE is configured to map the ACK/NACK response messages to the corresponding L bits according to an order of code word streams first, and then downlink component carriers or cells and finally subframes, or an order of code word streams first, and then subframes and finally component carriers (or cells).

In a TDD system, wherein the base station configures the UE to perform a logical AND to the ACK/NACK response messages associated with code word streams, the UE is configured to determine the number L of the bits of the ACK/NACK response messages according to the number of the downlink component carriers or cells configured for the UE and a ratio of uplink subframes and downlink subframes configured for the UE; and the UE is configured to map the ACK/NACK response messages to the corresponding L bits according to either an order of downlink component carriers or cells first and then subframes, or an order of subframes first and then downlink component carriers or cells.

In a TDD system, wherein the base station configures the UE to perform a logical AND to the ACK/NACK response messages associated with code word streams, the UE is configured to determine the number L of the bits of the ACK/NACK response messages according to the number of the downlink component carriers or cells configured for the UE and a ratio of uplink subframes and downlink subframes configured for the UE; and if downlink assignment indication (DAI) within downlink control information (DCI) of the base station requires that a total number of PDCCHs is accumulated according to an order of component carriers and then subframes, the UE is configured to map the ACK/NACK response messages to the corresponding bit positions according to the DAI.

The mapping, when conducted for the subframes, is conducted in a sequential order of the subframes.

The base station configures the UE whether or not to perform the logical AND to the ACK/NACK response messages associated the code word streams via a high layer signaling.

If the logical AND of the ACK/NACK response messages associated with the code word streams is not enabled, the bit number L is $$N * \sum_{i=0}^{M-1} x_i,$$

i=0, 1, ..., M−1; if the logical AND of the ACK/NACK response messages associated with the code word streams is enabled, the bit number L is N*M; wherein, M is a number of the downlink component carriers or cells allocated by the base station for the UE, N is a number of ACK/NACK response messages required by the uplink subframes for providing feedback for the downlink subframes, $x_i$ is a number of bits of the ACK/NACK response messages required by the transmission mode of a respective downlink component carrier or cell allocated for the UE, and $x_i$ is 1 if the transmission mode of a downlink component carrier contains 1 code word stream, and $x_i$ is 2 if the transmission mode of the downlink component carriers contains 2 code word streams.

The mapping, when conducted for the downlink component carriers or cells, is conducted in an order of primary downlink component carriers or cells first and then secondary downlink component carriers or cells; or the mapping is performed according to an index of a respective downlink component carrier or cell.

If the UE is unable to detect a PDSCH in a code word stream corresponding to a downlink component carrier or cell allocated for the UE, the UE is configured to generate a corresponding NACK response message for the downlink component carrier or cell.

An ACK response message ACK corresponds to binary "1", and a NACK response message corresponds to binary "0".

The L bits are processed by channel coding, scrambling, modulating, transform precoding (DFT operation), and time domain spreading, and then sent at a PUCCH in a manner of and transmitted to the base station in a PUCCH according to DFT-s-OFDM: and the L bits are processed by channel coding and channel interleaving and then multiplexed with data and sent to the base station in a PUSCH.

According to one aspect of the present invention, a method for mapping ACK/NACK response messages is further provided, comprising: a UE mapping ACK/NACK response messages corresponding to code word streams to a channel selection mapping table according to at least one of: whether a downlink component carrier or cell is a primary or secondary one, a sequence of the code word streams of the downlink component carrier or cell and a number of the code word streams contained in the downlink component carrier or cell; and the UE sending the ACK/NACK response messages using a PUCCH format 1b channel selection.

The UE maps the ACK/NACK response messages to the channel selection mapping table according to a number of downlink component carriers or cells that a base station allocates for the UE and a transmission mode of each of the configured downlink component carriers.

The UE maps the ACK/NACK response messages to the channel selection mapping table according to whether the downlink component carrier or cell is a primary or secondary one and an order of the code word streams of the downlink component carrier or cell, or a number of the code word streams contained in the downlink component carrier or cell.

The UE maps the ACK/NACK response messages to the channel selection mapping table according to an order of primary downlink component carriers or cells and then secondary downlink carriers or cells, or according to a decreasing order defined by a number of the code word streams contained in the downlink component carrier or cell.

For a channel selection mapping table in which M=2,
in an FDD system, the ACK/NACK response message of the first code word stream of the primary downlink component carriers or cells is mapped to a first HARQ-ACK, and the ACK/NACK response message of the first code word stream of the secondary downlink component carriers or cells is mapped to a second HARQ-ACK;

in a TDD system, the ACK/NACK response message of the first code word stream of the primary downlink component carriers or cells, or the result of the ACK/NACK response messages of a first code word stream and a second code word stream of the primary downlink component carriers or cells subjected to logical AND is mapped to a first HARQ-ACK, and the ACK/NACK response message of the first code word stream of the secondary downlink component carriers or cells, or the result of the ACK/NACK response messages of a first code word stream and a second code word stream of the secondary downlink component carriers or cells subjected to logical AND is mapped to a second HARQ-ACK.

For a channel selection mapping table in which M=3,
in an FDD system, the UE maps ACK/NACK response messages corresponding to code word streams to the channel selection mapping table by way of at least one of the following:
the ACK/NACK response message of the first code word stream of the primary downlink component carriers or cells is mapped to a first HARQ-ACK, the ACK/NACK response message of the first code word stream of a first secondary downlink component carrier or cell is mapped to a second HARQ-ACK, and the ACK/NACK response message of the first code word stream of a second secondary downlink component carrier or cell is mapped to a third HARQ-ACK;
the ACK/NACK response message of the first code word stream of the primary downlink component carriers or cells is mapped to the first HARQ-ACK, the ACK/NACK response message of the second code word stream of the primary downlink component carriers or cells is mapped to the second HARQ-ACK, and the ACK/NACK response message of the first code word stream of the secondary downlink component carriers or cells is mapped to the third HARQ-ACK;
the ACK/NACK response message of the first code word stream of the primary downlink component carriers or cells is mapped to the first HARQ-ACK, the ACK/NACK response message of the first code word stream of the secondary downlink component carriers or cells is mapped to the second HARQ-ACK, and the ACK/NACK response message of the second code word stream of the primary downlink component carriers or cells is mapped to the third HARQ-ACK;
the ACK/NACK response message of the first code word stream of the primary downlink component carriers or cells is mapped to the first HARQ-ACK, the ACK/NACK response message of the first code word stream of the secondary downlink component carriers or cells is mapped to the second HARQ-ACK, and the ACK/NACK response message of the second code word stream of the secondary downlink component carriers or cells is mapped to the third HARQ-ACK;
the ACK/NACK response messages of component carriers or cells containing two code word streams are respectively mapped to the first HARQ-ACK and the second HARQ-ACK(1), and the ACK/NACK response messages of component carriers or cells only containing one code word stream are mapped to the third HARQ-ACK;

in a TDD system, the UE maps ACK/NACK response messages corresponding to code word streams to the channel selection mapping table in the following manners:

the ACK/NACK response message of the first code word stream of the primary downlink component carriers or cells, or the result of the ACK/NACK response messages of a first code word stream and a second code word stream of the primary downlink component carriers or cells subjected to logical AND is mapped to the first HARQ-ACK, and the ACK/NACK response message of the first code word stream of a first secondary downlink component carriers or cells, or the result of the ACK/NACK response messages of a first code word stream and a second code word stream of the first secondary downlink component carriers or cells subjected to logical AND is mapped to the second HARQ-ACK; and the ACK/NACK response message of the first code word stream of a second secondary downlink component carrier or cell, or the result of the ACK/NACK response messages of a first code word stream and a second code word stream of the second secondary downlink component carrier or cell subjected to logical AND is mapped to the third HARQ-ACK.

For a channel selection mapping table in which M=4, in an FDD system, the UE maps ACK/NACK response messages corresponding to code word streams to the channel selection mapping table by way of at least one of the following:

the ACK/NACK response message of the first code word stream of the primary downlink component carriers or cells is mapped to a first HARQ-ACK, and the ACK/NACK response message of the first code word stream of a first secondary downlink component carrier or cell is mapped to a third HARQ-ACK; the ACK/NACK response message of the first code word stream of a second secondary downlink component carrier or cell is mapped to the third HARQ-ACK; the ACK/NACK response message of the first code word stream of a third secondary downlink component carrier or cell is mapped to a fourth HARQ-ACK;

the ACK/NACK response message of the first code word stream of the primary downlink component carriers or cells is mapped to the first HARQ-ACK, the ACK/NACK response message of the second code word stream of the primary downlink component carriers or cells is mapped to a second HARQ-ACK, the ACK/NACK response message of the first code word stream of the first secondary downlink component carriers or cells is mapped to the third HARQ-ACK, and the ACK/NACK response message of the first code word stream of the second secondary downlink component carriers or cells is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the primary downlink component carriers or cells is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the second code word stream of the first secondary downlink component carrier or cell is mapped to the third HARQ-ACK, and the ACK/NACK response message of the first code word stream of the second secondary downlink component carriers (or cells) is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the first secondary downlink component carrier or cell is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the second secondary downlink component carrier or cell is mapped to the fourth HARQ-ACK;

the ACK/NACK response messages of component carriers or cells containing two code word streams are respectively mapped to the first HARQ-ACK and the second HARQ-ACK, and the ACK/NACK response messages of component carriers or cells only containing one code word stream are respectively mapped to the third HARQ-ACK and the fourth HARQ-ACK;

the ACK/NACK response message of the first code word stream of the primary downlink component carriers or cells is mapped to the first HARQ-ACK, the ACK/NACK response message of the second code word stream of the primary downlink component carriers or cells is mapped to the second HARQ-ACK, the ACK/NACK response message of the first code word stream of the first secondary downlink component carrier or cell is mapped to the third HARQ-ACK, and the ACK/NACK response message of the second code word stream of the first secondary downlink component carrier or cell is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the second code word stream of the primary downlink component carriers or cells is mapped to the third HARQ-ACK, and the ACK/NACK response message of the second code word stream of the first secondary downlink component carrier or cell is mapped to the fourth HARQ-ACK;

in a TDD system, the UE maps ACK/NACK response messages corresponding to code word streams to the channel selection mapping table in the following manners:

the ACK/NACK response message of the first code word stream of the primary downlink component carriers or cells, or the result of the ACK/NACK response messages of a first code word stream and a second code word stream of the primary downlink component carriers or cells subjected to logical AND is mapped to the first HARQ-ACK, and the ACK/NACK response message of the first code word stream of the first secondary downlink component carriers or cells, or the result of the ACK/NACK response messages of a first code word stream and a second code word stream of the first secondary downlink component carriers or cells subjected to logical AND is mapped to the second HARQ-ACK;

the ACK/NACK response message of the first code word stream of the second secondary downlink component carrier or cell, or the result of the ACK/NACK response messages of a first code word stream and a second code word stream of the second secondary downlink component carrier or cell subjected to logical AND is mapped to the third HARQ-ACK;

the ACK/NACK response message of the first code word stream of the third secondary downlink component carrier or cell, or the result of the ACK/NACK response messages of a first code word stream and a second code word stream of the third secondary downlink component carrier or cell subjected to logical AND is mapped to the fourth HARQ-ACK:

the ACK/NACK response message of the first code word stream of the primary downlink component carriers or cells at a first subframe, or the result of the ACK/NACK response messages of a first code word stream and a second code word stream of the primary downlink component carriers or cells at the first subframe subjected to logical AND is mapped to the first HARQ-ACK, the ACK/NACK response message of the first code word stream of the secondary downlink component carriers or cells at a first subframe, or the result of the ACK/NACK response messages of a first code word stream and a second code word stream of the secondary downlink component carriers or cells at the first subframe subjected to logical AND is mapped to the second HARQ-ACK, the ACK/NACK response message of the first code word stream of the primary downlink component carriers or cells at a second subframe, or the result of the ACK/NACK response messages of a first code word stream and a second code word stream of the primary downlink component carriers or cells at the second subframe subjected to logical AND is mapped to the third HARQ-ACK, and the ACK/NACK response message of the first code word stream of the secondary downlink component carriers or cells at a second subframe, or the result of the ACK/NACK response messages of a first code word stream and a second code word stream of the secondary downlink component carriers or cells at the second subframe subjected to logical AND is mapped to the fourth HARQ-ACK; the ACK/NACK response message of the first code word stream of the primary downlink component carriers or cells at a first subframe, or the result of the ACK/NACK response messages of a first code word stream and a second code word stream of the primary downlink component carriers or cells at the first subframe subjected to logical AND is mapped to the first HARQ-ACK, the ACK/NACK response message of the first code word stream of the primary downlink component carriers or cells at a second subframe, or the result of the ACK/NACK response messages of a first code word stream and a second code word stream of the primary downlink component carriers or cells at the second subframe subjected to logical AND is mapped to the second HARQ-ACK, the ACK/NACK response message of the first code word stream of the secondary downlink component carriers or cells at a first subframe, or the result of the ACK/NACK response messages of a first code word stream and a second code word stream of the secondary downlink component carriers or cells at the first subframe subjected to logical AND is mapped to the third HARQ-ACK, and the ACK/NACK response message of the first code word stream of the secondary downlink component carriers or cells at a second subframe, or the result of the ACK/NACK response messages of a first code word stream and a second code word stream of the secondary downlink component carriers or cells at the second subframe subjected to logical AND is mapped to the fourth HARQ-ACK.

The secondary downlink component carriers or cells are sorted according to a predefined order; wherein, the predefined order is obtained according to a carrier index or according to the value of a carrier index field CIF when cross-carrier scheduling is enabled.

According to another aspect of the present invention, a user equipment is provided, comprising: a determination module configured to determine a number L of bits of ACK/NACK response messages according to predetermined conditions, wherein, the predetermined conditions include at least one of: a number of downlink component carriers or cells that are allocated to the UE by a base station, and a transmission mode of each of the downlink component carriers; and a mapping module configured to map the ACK/NACK response messages to the L bits; and a sending module, configured to, after the L bits are processed by channel coding, scrambling, modulating, transform precoding, and time domain spreading, send the L bits on a PUCCH format in form of DFT-s-OFDM; or configured to, after the L bits are processed by channel coding and channel interleaving and then multiplexed with data, send the L bits to the base station in a PUSCH.

According to another aspect of the present invention, a user equipment is further provided, comprising: a mapping module configured to map ACK/NACK response messages corresponding to code word streams to a channel selection mapping table according to at least one of: whether a downlink component carrier or cell is a primary or secondary one, a sequence of the code word streams of the downlink component carrier or cell and a number of the code word streams contained in the downlink component carrier or cell; and a sending module configured to send the ACK/NACK response messages using a PUCCH format 1*b* channel selection.

The present invention solves the problem in the prior art that the base station may incorrectly understand the ACK/NACK response messages fed back by the UE and thus error is incurred, and thus can correctly process the ACK/NACK response messages.

BRIEF DESCRIPTION OF THE ACCOMPANYING DRAWINGS

The accompanying drawings described herein are used to provide a further understanding of the present invention and constitute a portion of the present application. The schematic embodiments of the present invention and the explanations thereof are used to explain the present invention, and do not constitute inappropriate limitations on the present invention. In the accompanying drawings.

DETAILED DESCRIPTION OF THE INVENTION

The present invention will be detailed hereinafter referring to the accompanying drawings in conjunction with the embodiments. Please note that the embodiments in the present application and the features in the embodiments can be combined without causing conflict.

Figure 1:
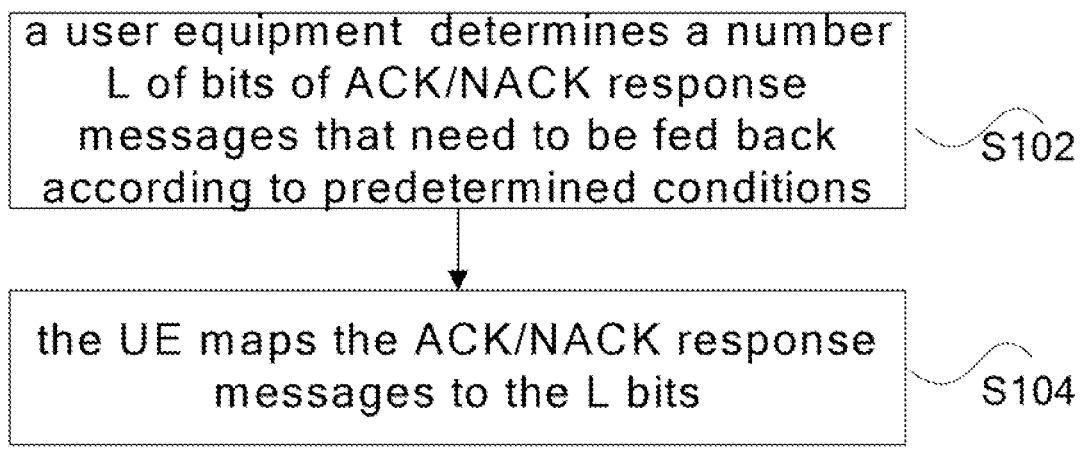
FIG. 1 is a flow chart of the mapping method for ACK/NACK response messages according to an embodiment of the present invention.

FIG. 1 is a flow chart of the mapping method for ACK/NACK response messages according to an embodiment of the present invention. As shown in FIG. 1, the flow comprises following steps:

Step S102, a user equipment (UE) determines a number L of bits of ACK/NACK response messages that need to be fed back according to predetermined conditions, wherein, the predetermined conditions include at least one of: a number of downlink component carriers or cells that are allocated to the UE by a base station, and a transmission mode of each of the downlink component carriers; and Step S104, the UE maps the ACK/NACK response messages to the L bits.

The following description is made taking the sending of the ACK/NACK at a PUCCH format 3 and at a PUSCH. An FDD system and a TDD system are respectively described in the following preferred embodiments.

In an FDD system, the UE is configured to determine the number L of the bits of the ACK/NACK response messages according to the number of the downlink component carriers or cells that the base station allocates for the UE and to the transmission mode of each of the downlink component carriers; and the UE is configured to map the ACK/NACK response messages to the corresponding L bits according to either an order of code word streams and then downlink component carriers or cells or an order of downlink component carriers or cells and then code word streams.

Preferably, suppose the number of the downlink component carriers (or cells) that the base station configures to the UE is M, and the number of bits of the ACK/NACK response messages by the transmission mode of respective downlink component carriers (or cells) configured to the UE is $x_i$, i=0, 1, ..., M−1, and $$x_i = \begin{cases} 1. \text{when the transmission mode of the downlink component carrier only contains one code word stream,} \\ 2. \text{when the transmission mode of the downlink component carrier contains two code word streams,} \end{cases}.$$

The number of bits that the UE needs to feed back is $$L = \sum_{i=0}^{M-1} x_i.$$

In a TDD system, the UE is configured to determine the number L of the bits of the ACK/NACK response messages according to the number of the downlink component carriers or cells that the base station allocates for the UE, a ratio of uplink subframes and downlink subframes allocated for the UE and the transmission mode of each of the downlink component carriers; and the UE is configured to map the ACK/NACK response messages to the corresponding L bits according to an order of code word streams and then downlink component carriers or cells and then subframes, or an order of code word streams and then subframes and then component carriers (or cells).

Preferably, the base station configures the UE to perform a logical AND to the ACK/NACK response messages associated with code word streams, the UE is configured to determine the number L of the bits of the ACK/NACK response messages according to the number of the downlink component carriers or cells allocated for the UE and a ratio of uplink subframes and downlink subframes allocated for the UE; and the UE is configured to map the ACK/NACK response messages to the corresponding L bits according to either an order of downlink component carriers (or cells) and then subframes, or an order of subframes and then downlink component carriers (or cells).

Preferably, in a TDD system, the base station configures the UE to perform a logical AND to the ACK/NACK response messages associated with code word streams, the UE is configured to determine the number L of the bits of the ACK/NACK response messages according to the number of the downlink component carriers or cells allocated for the UE and a ratio of uplink subframes and downlink subframes allocated for the UE; and if downlink assignment information (DAI) within downlink control information (DCI) of the base station requires that a total number of PDCCHs is accumulated according to an order of component carriers and then subframes, the UE is configured to map the ACK/NACK response messages to the corresponding bit positions according to the DAI.

Preferably, suppose the number of the downlink component carriers (or cells) that the base station configures to the UE is M, and a certain uplink subframe needs to feed back the ACK/NACK response messages of N downlink subframes, and the number of bits of the ACK/NACK response messages by the respective downlink component carriers (or cells) configured to the UE is $x_i$, i=0, 1, ..., M−1, and $$x_i = \begin{cases} 1, \text{when the transmission mode of the downlink component} \\ \quad \text{carrier only contains one code word stream,} \\ 2, \text{when the transmission mode of the downlink component} \\ \quad \text{carrier contains two code word streams, .} \end{cases}$$

The number of bits that the UE needs to feed back is:

$$L = \begin{cases} N, \sum_{i=0}^{M-1} x_i, \text{when the logic and of the correct/wrong response} \\ \quad \text{messages between the code word streams is not enabled} \\ N, M, \text{when the logic and of the correct/wrong response messages} \\ \quad \text{between the code word streams is enabled, .} \end{cases}$$

The following preferred embodiments can be used for both the FDD system and the TDD system.

Preferably, if mapping is conducted according to the component carriers (or cells), primary downlink component carriers (or cells) are mapped first and then secondary component carriers or cells are mapped; or mapping is conducted according to the index of the component carriers (or cells).

Preferably, if mapping is conducted based on the subframes, mapping is conducted based on the order of the subframes.

Preferably, if the UE is unable to detect a PDSCH in a code word stream corresponding to a downlink component carrier or cell allocated for the UE, the UE is configured to generate a corresponding NACK response message for the downlink component carrier or cell.

Preferably, an ACK response message ACK corresponds to binary "1", and a NACK response message corresponds to binary "0".

Preferably, the L bits are processed by channel coding, scrambling, modulating, transform precoding, and time domain expansion, and then sent at a PUCCH in a manner of and transmitted to the base station in a PUCCH according to DFT-s-OFDM; or the L bits are processed by channel coding and channel interleaving and then multiplexed with data and sent to the base station in a PUSCH.

The preferred embodiments will be described hereinafter in conjunction with the accompanying drawings.

Preferred Embodiment 1

Figure 2:
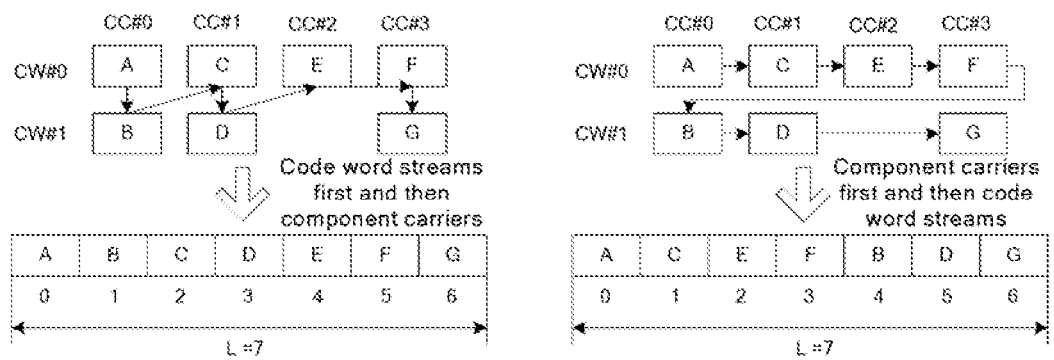
FIG. 2 is a schematic view of the mapping method for ACK/NACK response messages in an FDD system according to an embodiment of the present invention.

As shown in FIG. 2, in the FDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK. The UE determines the number $$L = \sum_{i=0}^{M-1} x_i$$

of the bits of ACK/NACK response messages that need to be fed back is 7 according to the number of downlink component carriers (or cells) that are configured to the UE by the base station and the transmission mode of each of the configured downlink component carriers. The ACK/NACK response messages corresponding to the two code word streams of DL CC#0 are {A, B}, the ACK/NACK response messages corresponding to the two code word streams of DL CC#1 are {C, D}, the ACK/NACK response message corresponding to DL CC#2 is {E}, and the ACK/NACK response messages corresponding to the two code word streams of DL CC#3 are {F, G}, wherein A/B/C/D/E/F ∈{ACK, NACK}, and when the UE has not detected the PDSCH at the code word stream corresponding to the configured downlink component carriers (or cells), its corresponding ACK/NACK response messages are set as a NACK response message; suppose the order is DL CC#0, 1, 2, 3 when mapping is conducted according to the order of the component carriers.

When the UE maps the corresponding ACK/NACK response messages to the L bits according to the order from code word streams to component carriers (or cells), the 7 bits that the UE needs to feed back sequentially correspond to {A, B, C, D, E, F, G}.

When the UE maps the corresponding ACK/NACK response messages to the L bits according to the order from component carriers (or cells) to code word streams, the 7 bits fed back by the UE need to sequentially correspond to {A, C, E, F, B, D, G}.

Preferred Embodiment 2

Figure 3:
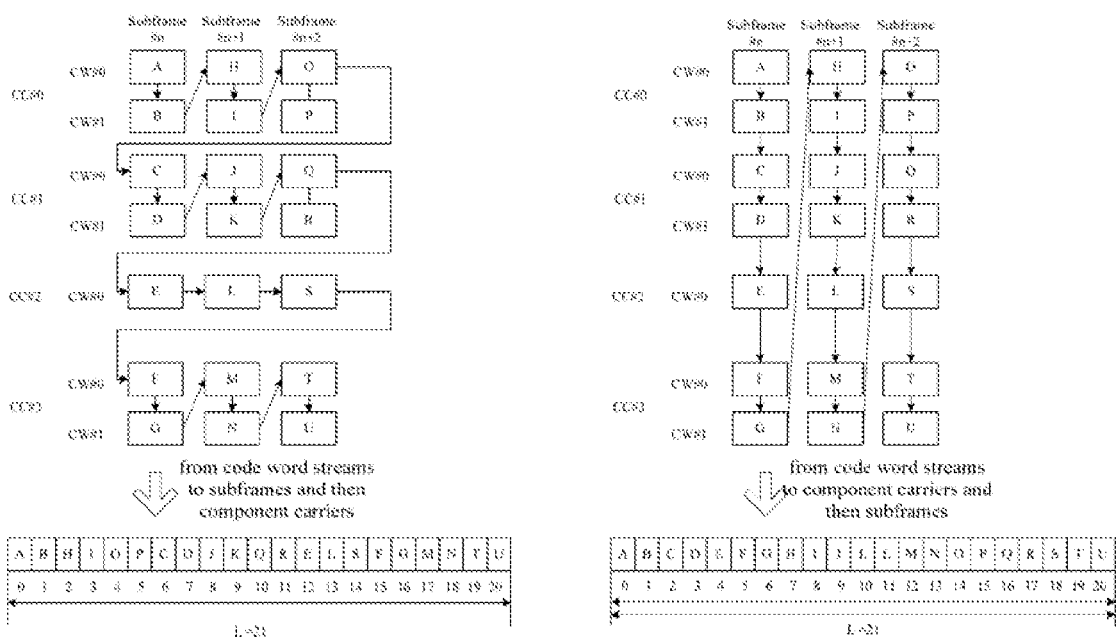
FIG. 3 is a schematic view of the mapping method for ACK/NACK response messages in a TDD system according to an embodiment of the present invention.

As shown in FIG. 3, in the TDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK, and at the same time suppose a certain uplink subframe needs to feed back the ACK/NACK response messages corresponding to downlink subframes #n, #n+1 and #n+2. Suppose the base station has configured that the UE does not need to conduct the logical AND of the ACK/NACK response messages between the code word streams, the UE determines the number $$L = N \cdot \sum_{i=0}^{M-1} x_i$$

of the ACK/NACK response messages is 21 according to the number of downlink component carriers (or cells) that are configured to the UE by the base station, the ratio relationship of the configured uplink and downlink subframes and the transmission mode of each of the configured downlink component carriers. The feedback state of the corresponding code word stream for each of the component carriers in each corresponding subframe is shown in FIG. 3, wherein A, B, C, . . . , U ∈ {ACK,NACK}, when the UE has not detected the PDSCH at the code word stream corresponding to the configured downlink component carriers (or cells), its corresponding ACK/NACK response messages are set as a wrong response message NACK; suppose the order is DL CC#0, 1, 2, 3 when mapping is conducted according to the order of the component carriers, and the order is subframes #n, #n+1 and #n+2 when mapping is conducted according to the order of the subframes.

When the UE maps the corresponding ACK/NACK response messages to the L bits according to the order from code word streams to subframes and then component carriers (or cells), the 21 bits that the UE needs to feed back sequentially correspond to {A, B, H, I, O, P, C, D, J, K, Q, R, E, L, S, F, G, M, N, T, U}.

When the UE maps the corresponding ACK/NACK response messages to the L bits according to the order from code word streams to component carriers (or cells) and then subframes, the 21 bits that the UE needs to feed back sequentially correspond to {A, B, C, D, E, F, G, H, I, J, K, L, M, N, O, P, Q, R, S, T, U}.

Preferred Embodiment 3

Figure 4:
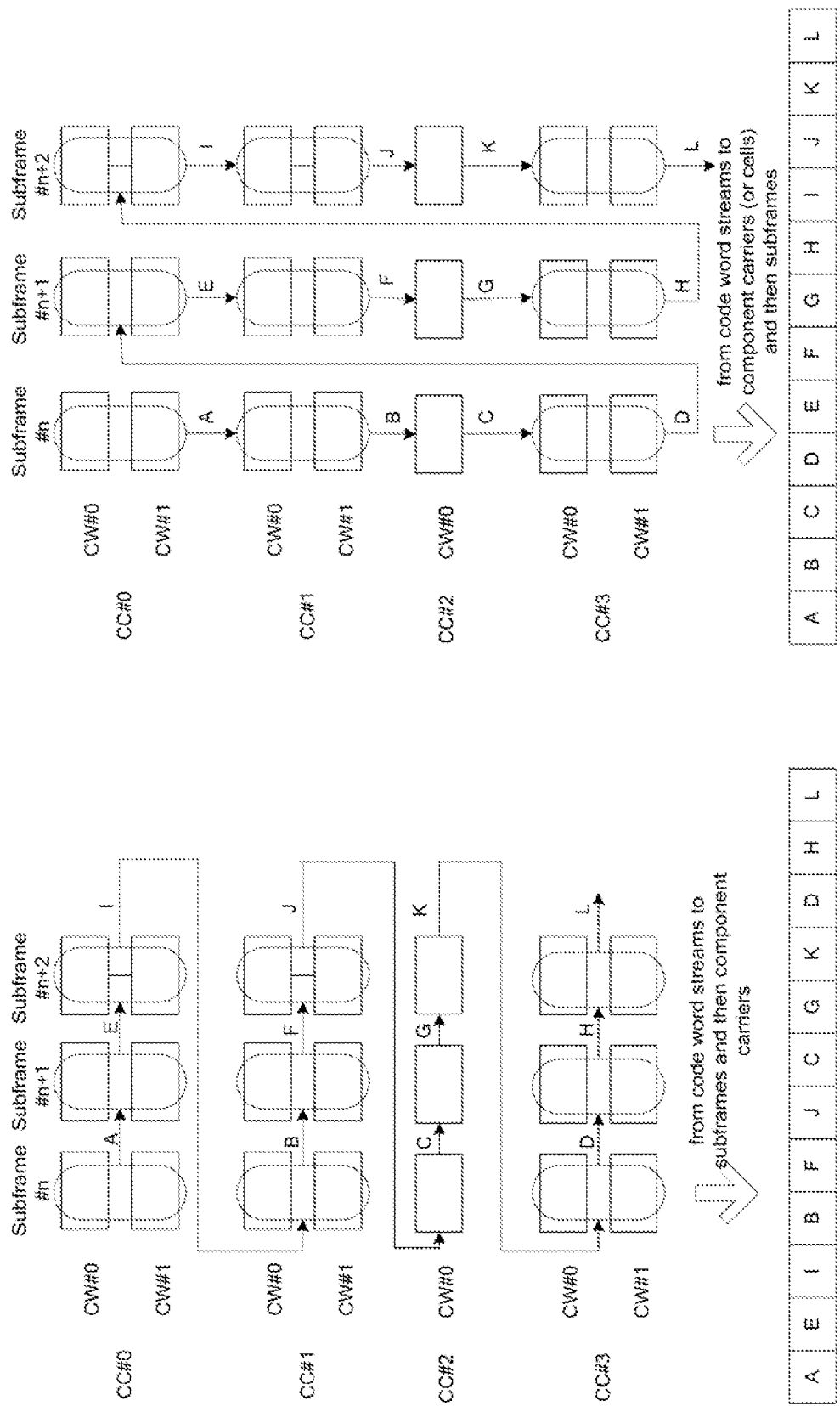
FIG. 4 is another schematic view of the mapping method for ACK/NACK response messages in a TDD system according to an embodiment of the present invention.

As shown in FIG. 4, in the TDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK, and at the same time suppose a certain uplink subframe needs to feed back the ACK/NACK response messages of downlink subframes #n, #n+1 and #n+2. Suppose the base station has configured that the UE needs to conduct the logical AND of the ACK/NACK response messages between the code word streams, the UE determines the number L=N.M of the bits of ACK/NACK response messages is 12 according to the number of downlink component carriers (or cells) that are configured to the UE by the base station, the ratio relationship of the configured uplink and downlink subframes and the transmission mode of each of the configured downlink component carriers. The feedback state of the corresponding code word stream or the feedback state of the logical AND result of the corresponding code word streams for each of the component carriers in each corresponding subframe is shown in FIG. 4, wherein A, B, C, . . . , L∈{ACK, NACK}, and when the UE has not detected the PDSCH at the code word stream corresponding to the configured downlink component carriers (or cells), its corresponding ACK/NACK response messages are set as a wrong response message NACK; suppose the order is DL CC#0, 1, 2, 3 when mapping is conducted according to the order of the component carriers, and the order is subframes #n, #n+1 and #n+2 when mapping is conducted according to the order of the subframes.

When the UE maps the corresponding ACK/NACK response messages to the L bits according to the order from code word streams to subframes and then component carriers (or cells), the 12 bits that the UE needs to feed back sequentially correspond to {A, E, I, B, F, J, C, G, K, D, H, L}.

When the UE maps the corresponding ACK/NACK response messages to the L bits according to the order from code word streams to component carriers (or cells) and then subframes, the 12 bits that the UE needs to feed back sequentially correspond to {A, B, C, D, E, F, G, H, I, J, K, L}.

Preferred Embodiment 4

Figure 5:
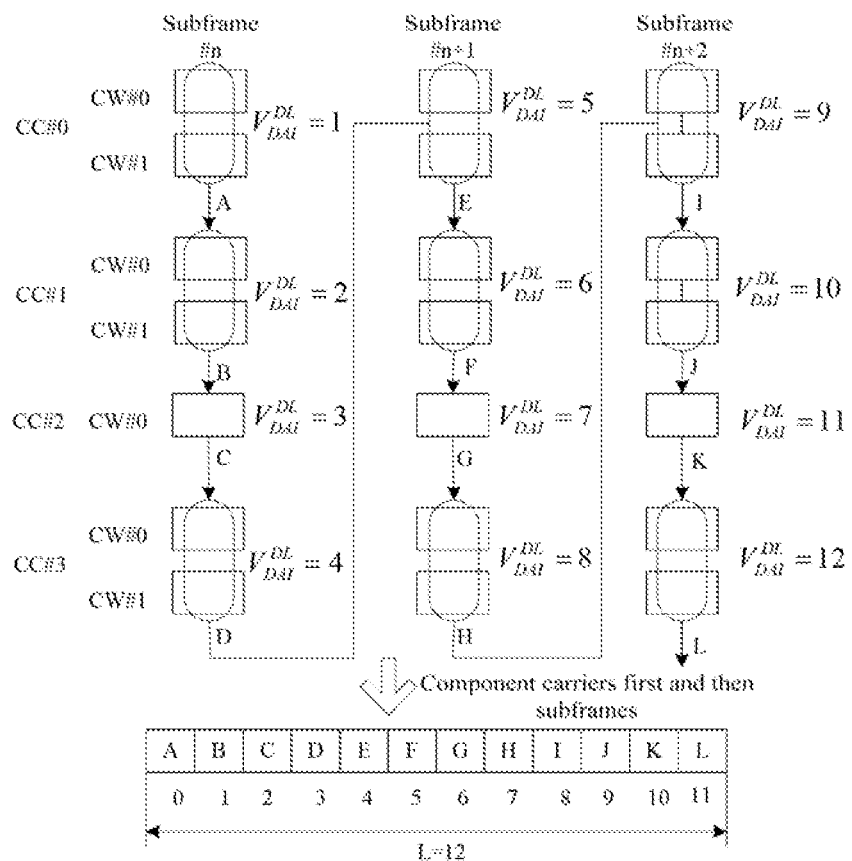
FIG. 5 is another schematic view of the mapping method for ACK/NACK response messages in a TDD system according to an embodiment of the present invention.

As shown in FIG. 5, in the TDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK, and at the same time suppose a certain uplink subframe needs to feed back the ACK/NACK response messages of downlink subframes #n, #n+1 and #n+2. Suppose the base station has configured that the UE needs to conduct the logical AND of the ACK/NACK response messages between the code word streams, the UE determines the number L=N.M of the bits of ACK/NACK response messages is 12 according to the number of downlink component carriers (or cells) that are configured to the UE by the base station, the ratio relationship of the configured uplink and downlink subframes and the transmission mode of each of the configured downlink component carriers. The feedback state of the corresponding code word stream or the feedback state of the logical AND result of the corresponding code word streams for each of the component carriers in each corresponding subframe is shown in FIG. 5, wherein A, B, C, . . . , L∈{ACK,NACK}, and when the UE has not detected the PDSCH at the code word stream corresponding to the configured downlink component carriers (or cells), its corresponding ACK/NACK response messages are set as a wrong response message NACK; suppose the downlink assignment information DAI of the downlink control information DCI of the base station refers to the number of accumulated PDCCHs according to an order from component carriers to subframes, and the DAI is indicated with 2 bits, wherein 2 bits can indicate 4 different states:

The first state ("00") refers to that the number of the scheduled PDCCHs that are accumulated up to now is 1/5/9/13/17;

The second state ("01") refers to that the number of the scheduled PDCCHs that are accumulated up to now is 2/6/10/14/18;

The third state ("10") refers to that the number of the scheduled PDCCHs that are accumulated up to now is 3/7/11/15/19;

The fourth state ("11") refers to that the number of the scheduled PDCCHs that are accumulated up to now is 4/8/12/16/20;

The UE detects the DAI and determines the number of the scheduled PDCCHs that are indicated by the DAI:

When the DAI detected by the UE is the first state ("00") and the state appears the first time, the UE determines that the number of the scheduled PDCCH indicated by the DAI is 1;

When the DAI detected by the UE is the first state ("00") and the state appears the second time, the UE determines that the number of the scheduled PDCCHs indicated by the DAI is 5;

When the DAI detected by the UE is the first state ("00") and the state appears the third time, the UE determines that the number of the scheduled PDCCHs indicated by the DAI is 9;

When the DAI detected by the UE is the first state ("00") and the state appears the fourth time, the UE determines that the number of the scheduled PDCCHs indicated by the DAI is 13;

When the DAI detected by the UE is the first state ("00") and the state appears the fifth time, the UE determines that the number of the scheduled PDCCHs indicated by the DAI is 17;

Likewise, when the DAI detected by the UE is the second state ("01") and the state appears the first/second/third/fourth/fifth time, the UE determines that the number of the scheduled PDCCHs indicated by the DAI is 2/6/10/14/18;

Likewise, when the DAI detected by the UE is the third state ("10") and the state appears the first/second/third/fourth/fifth time, the UE determines that the number of the scheduled PDCCHs indicated by the DAI is 3/7/11/15/19;

Likewise, when the DAI detected by the UE is the fourth state ("11") and the state appears the first/second/third/fourth/fifth time, the UE determines that the number of the scheduled PDCCHs indicated by the DAI is 4/8/12/16/20;

Thus, the values of the DAI detected by the UE in the corresponding subframes of the respective component carriers are shown in FIG. 5.

According to the DAI, the UE maps the corresponding ACK/NACK response messages to the bit positions corresponding to the $V_{DAI}^{DL}-1$, and the 12 bits that the UE needs to feed back sequentially correspond to {A, B, C, D, E, F, G, H, I, J, K, L}.

Preferred Embodiment 5

Figure 6:
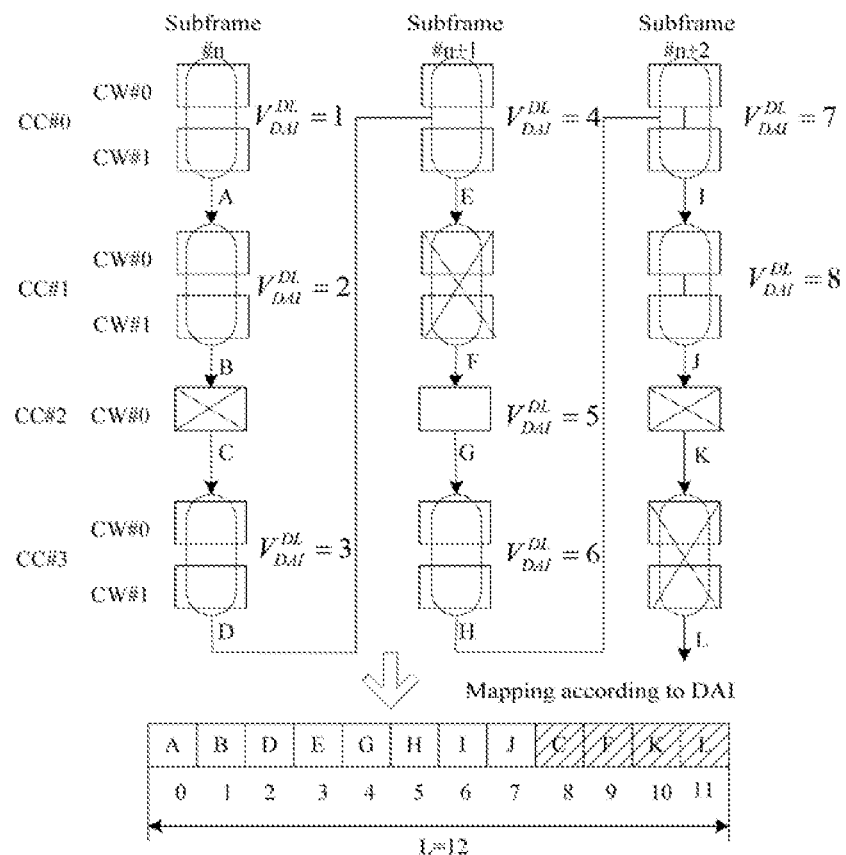
FIG. 6 is another schematic view of the mapping method for ACK/NACK response messages in a TDD system according to an embodiment of the present invention.

As shown in FIG. 6, in the TDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK, and at the same time suppose a certain uplink subframe needs to feed back the ACK/NACK response messages of downlink subframes #n, #n+1 and #n+2. Suppose the base station has configured that the UE needs to conduct the logical AND of the ACK/NACK response messages between the code word streams, the UE determines the number L=N.M of the bits of ACK/NACK response messages is 12 according to the number of downlink component carriers (or cells) that are configured to the UE by the base station, the ratio relationship of the configured uplink and downlink and the transmission mode of each of the configured downlink component carriers. The feedback state of each of the component carriers at the corresponding code word stream of corresponding subframes or the feedback state of each of the component carriers subjected to the logical AND operation of the code word stream is shown in FIG. 6, wherein A, B, C, . . . , L∈{ACK,NACK}, and when the UE has not detected the PDSCH at the code word stream corresponding to the configured downlink component carriers (or cells), its corresponding ACK/NACK response messages are set as a wrong response message NACK;

The meaning represented by the base station side DAI and the explanation of the DAI by the UE side are the same with the preferred embodiment 4.

Being different from the preferred embodiment 4, in the preferred embodiment 4, all the configured component carriers of all the downlink subframes have been scheduled, while in this embodiment, the configured downlink component carriers of some subframes have not been scheduled, as shown in FIG. 6, the DL CC#2 at the subframe #n has not been scheduled, the DL CC#11 at subframe #n+1 and the DL CC#2 and 3 at the subframe #n+2 have not been scheduled, then according to the DAI, the UE maps the corresponding ACK/NACK response messages to the bit positions corresponding to the $V_{DAI}^{DL}-1$, and the 12 bits that the UE needs to feed back sequentially correspond to {A, B, D, E, G, H, I, J, X, X, X, X}. Wherein, the last 4 bits have nothing to do with how to map the ACK/NACK response messages of the corresponding component carriers of the downlink subframes, as such ACK/NACK response messages are all NACK.

Preferred Embodiment 6

Figure 7:
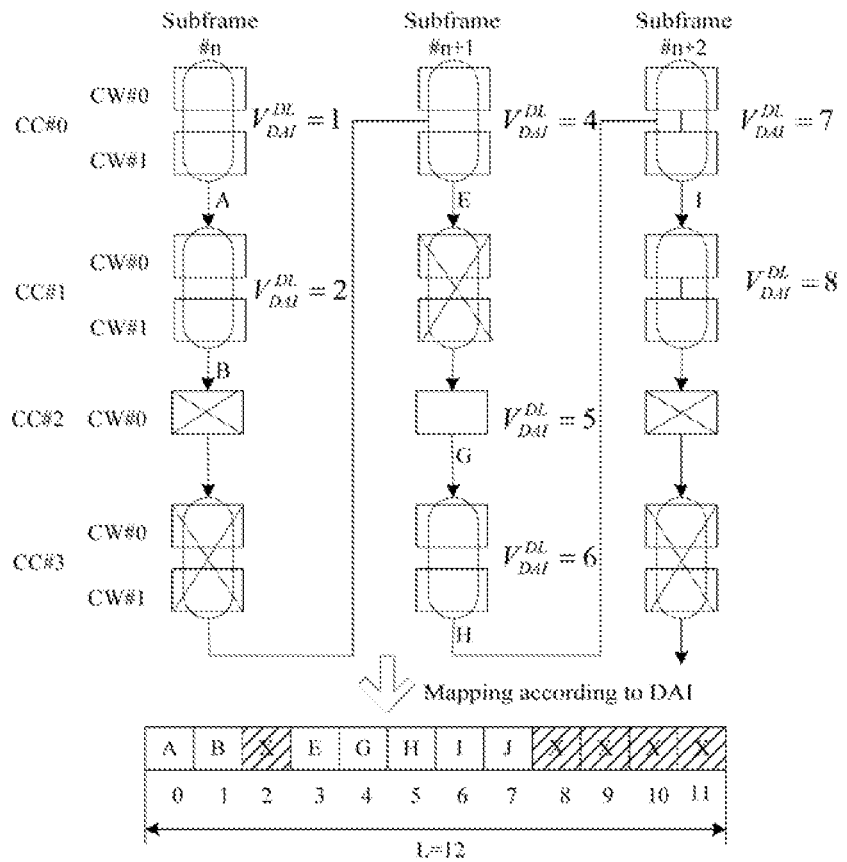
FIG. 7 is another schematic view of the mapping method for ACK/NACK response messages in a TDD system according to an embodiment of the present invention.

As shown in FIG. 7, in the TDD system, the base station configures 4 downlink component carriers {DL CC#0, DL CC#1, DL CC#2, DL CC#3} to the UE, wherein all of DL CC#0/1/3 need to feed back 2 bits of ACK/NACK, while the DL CC#2 needs to feed back 1 bit of ACK/NACK, and at the same time suppose a certain uplink subframe needs to feed back the ACK/NACK response messages of downlink subframes #n, #n+1 and #n+2. Suppose the base station has configured that the UE needs to conduct the logical AND of the ACK/NACK response messages between the code word streams, the UE determines the number I=N.M of the bits of ACK/NACK response messages is 12 according to the number of downlink component carriers (or cells) that are configured to the UE by the base station, the ratio relationship of the configured uplink and downlink and the transmission mode of each of the configured downlink component carriers. The feedback state of the corresponding code word stream or the feedback state of the logical AND result of the corresponding code word streams for each of the component carriers in each corresponding subframe is shown in FIG. 7, wherein A, B, C, . . . , L∈{ACK,NACK}, and when the UE has not detected the PDSCH at the code word stream corresponding to the configured downlink component carriers (or cells), its corresponding ACK/NACK response messages are set as a wrong response message NACK;

The meaning represented by the base station side DAI and the explanation of the DAI by the UE side are the same with the preferred embodiment 4.

Being different from the preferred embodiment 4, in the preferred embodiment 4, all the configured component carriers of all the downlink subframes have been scheduled, while in this embodiment, the configured downlink component carriers of some subframes have not been scheduled, as shown in FIG. 7, the DL CC#2 and 3 at the subframe #n have not been scheduled, the DL CC#1 at subframe #n+1 and the DL CC#2 and 3 at the subframe #n+2 have not been scheduled. Being different from the preferred embodiment 5, the UE has the error of losing the PDCCH, that is, the base station scheduled the PDSCH at the component carriers of some subframes, while the UE cannot detect the PDSCH as it has not detected the corresponding PDCCH, and this error can be discovered according to the DAI. Specifically speaking, as shown in FIG. 7, the DAI at the downlink component carriers corresponding to all the downlink subframes detected by the UE is sequentially 1, 2, 4, 5, 6, 7 and 8, and according to the detected DAI the UE can determine that the PDCCH which DAI corresponds to 3 has lost, thus the state of the second bit (from 0) of the L bits corresponding to the DAI which is 3 is set as NACK, then the UE, according to the DAI, maps the corresponding ACK/NACK response messages to the bit positions corresponding to the $V_{DAI}^{DL}-1$, and the 12 bits that the UE needs to feed back sequentially correspond to {A, B, X, E, G, H, I, J, X, X, X, X}. Wherein, it is not important that the second bit of the bits as fed back corresponds to the state of which downlink component carrier of which downlink subframe, as the corresponding ACK/NACK response messages are all NACK, and how to map the last 4 bits to the ACK/NACK response messages of the corresponding component carriers of the downlink subframes is not important, either, as such ACK/NACK response messages are all NACK.

A UE is further provided in another embodiment, and is configured to realize the above embodiments and their preferred embodiments. Those which have been described will not be described any more, and only the modules of the UE will be described hereinafter.

Figure 8:
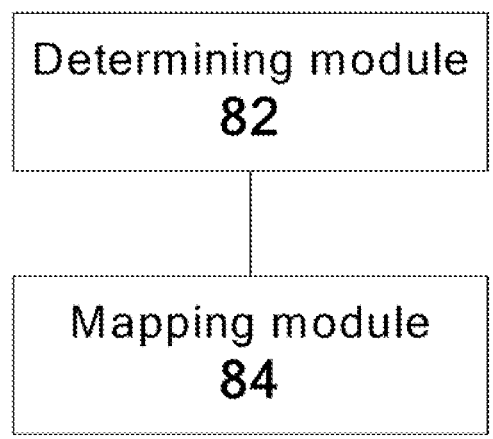
FIG. 8 is a block diagram of the structure of the UE according to an embodiment of the present invention.

FIG. 8 is a block diagram of the structure of the UE according to the embodiment of the present invention, and as shown in FIG. 8, the UE comprises a determination module 82 and a mapping module 84, which will be described as follow.

The determination module 82 is configured to determine a number L of the bits of ACK/NACK ACK/NACK response messages according to predetermined conditions, wherein, the predetermined conditions comprise at least one of the number of downlink component carriers or cells that are configured to the UE by a base station, and the transmission mode of each of the downlink component carriers; and the mapping module 84 is connected to the determination module 82 and configured to map the ACK/NACK response messages to the L bits.

The following embodiments are applicable to send the ACK/NACK at the PUCCH format 1b using channel selection.

Figure 9:
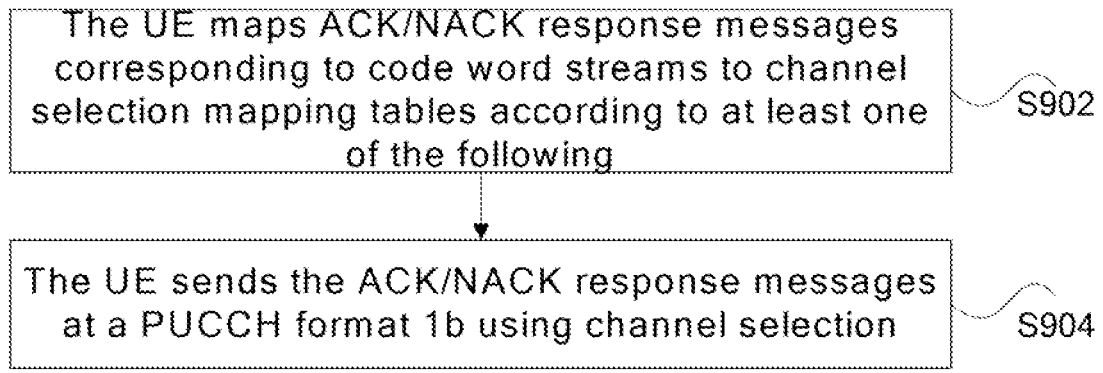
FIG. 9 is another flow chart of the mapping method for ACK/NACK response messages according to an embodiment of the present invention.

FIG. 9 is another flow chart of the mapping method for ACK/NACK response messages according to an embodiment of the present invention, and as shown in FIG. 9, the flow comprises following steps:

Step S902, the UE maps ACK/NACK response messages corresponding to code word streams to channel selection mapping tables according to at least one of: whether downlink component carriers or cells are primary or secondary ones, the order of the code word streams of the downlink component carriers or cells and the number of the code word streams contained in the downlink component carriers or cells; and Step S904, the UE sends the ACK/NACK response messages at a PUCCH format 1b using channel selection.

Preferably, the UE may map the ACK/NACK response messages to the channel selection mapping tables according to the number M of the downlink component carriers or cells that the base station configures to it.

Preferably, the UE may map ACK/NACK response messages to the channel selection mapping tables according to whether downlink component carriers or cells are primary or secondary ones and the order of the code word streams of the downlink component carriers or cells, or the number of the code word streams contained in the downlink component carriers or cells.

Preferably, the UE may map the ACK/NACK response messages to the channel selection mapping tables according to an order from primary downlink component carriers or cells to secondary downlink carriers or cells, or according to the number of the code word streams contained in the downlink component carriers or cells in an order from more to less.

Description will be made hereinafter from the FDD system and the TDD system.

In the FDD system, for a channel selection mapping table in which M=2, the ACK/NACK response message of the first code word stream of the primary downlink component carrier (or cells) is mapped to a first HARQ-ACK, and the ACK/NACK response message of the first code word stream of the secondary downlink component carriers (or cells) is mapped to a second HARQ-ACK (for example, applicable to the occasion of 2CC and a single code word stream).

For a channel selection mapping table in which M=3, the ACK/NACK response message of the first code word stream of the primary downlink component carriers (or cells) is mapped to a first HARQ-ACK, and the ACK/NACK response message of the first code word stream of a first secondary downlink component carrier (or cell) is mapped to a second HARQ-ACK; and the ACK/NACK response message of the first code word stream of a second secondary downlink component carrier (or cell) is mapped to a third HARQ-ACK (for example, applicable to the occasion of 3CC and a single code word stream);

Or the ACK/NACK response message of the first code word stream of the primary downlink component carriers (or cells) is mapped to the first HARQ-ACK, the ACK/NACK response message of the second code word stream of the primary downlink component carriers (or cells) is mapped to the second HARQ-ACK, and the ACK/NACK response message of the first code word stream of the secondary downlink component carriers (or cells) is mapped to the third HARQ-ACK (for example, applicable to the occasions of 2CC, PCC: MIMO, SCC: SIMO);

Or the ACK/NACK response message of the first code word stream of the primary downlink component carriers (or cells) is mapped to the first HARQ-ACK, the ACK/NACK response message of the first code word stream of the secondary downlink component carriers (or cells) is mapped to the second HARQ-ACK, and the ACK/NACK response message of the second code word stream of the primary downlink component carriers (or cells) is mapped to the third HARQ-ACK (for example, applicable to the occasions of 2CC, PCC: MIMO, SCC: SIMO);

Or the ACK/NACK response message of the first code word stream of the primary downlink component carriers (or cells) is mapped to the first HARQ-ACK, the ACK/NACK response message of the first code word stream of the secondary downlink component carriers (or cells) is mapped to the second HARQ-ACK, and the ACK/NACK response message of the second code word stream of the secondary downlink component carriers (or cells) is mapped to the third HARQ-ACK (for example, applicable to the occasions of 2CC, PCC: MIMO, SCC: SIMO);

Or the ACK/NACK response messages of component carriers (or cells) containing two code word streams are respectively mapped to HARQ-ACK(0) (that is, the first HARQ-ACK) and HARQ-ACK(1) (that is, the second HARQ-ACK), and the ACK/NACK response messages of component carriers (or cells) only containing one code word stream are mapped to HARQ-ACK(2) (that is, the third HARQ-ACK).

For a channel selection mapping table in which M=4, the ACK/NACK response message of the first code word stream of the primary downlink component carriers (or cells) is mapped to a first HARQ-ACK, and the ACK/NACK response message of the first code word stream of a first secondary downlink component carrier (or cell) is mapped to a third HARQ-ACK; the ACK/NACK response message of the first code word stream of a second secondary downlink component carrier (or cell) is mapped to the third HARQ-ACK; the ACK/NACK response message of the first code word stream of a third secondary downlink component carrier (or cell) is mapped to a fourth HARQ-ACK (for example, applicable to occasions of 4CC, average SIMO);

Or the ACK/NACK response message of the first code word stream of the primary downlink component carriers (or cells) is mapped to the first HARQ-ACK, the ACK/NACK response message of the second code word stream of the primary downlink component carriers (or cells) is mapped to a second HARQ-ACK, the ACK/NACK response message of the first code word stream of the first secondary downlink component carrier (or cell) is mapped to the third HARQ-ACK, and the ACK/NACK response message of the first code word stream of the second secondary downlink component carrier (or cell) is mapped to the fourth HARQ-ACK (for example, applicable to the occasions of 3CC, PCC: MIMO, SCC1-2: SIMO);

Or the ACK/NACK response message of the first code word stream of the primary downlink component carriers (or cells) is mapped to the first HARQ-ACK, the ACK/NACK response message of the first code word stream of the first secondary downlink component carrier (or cell) is mapped to the second HARQ-ACK, the ACK/NACK response message of the first code word stream of the second secondary downlink component carrier (or cell) is mapped to the third HARQ-ACK, and the ACK/NACK response message of the second code word stream of the primary downlink component carriers (or cells) is mapped to the fourth HARQ-ACK (for example, applicable to the occasions of 3CC, PCC: MIMO, SCC1-2: SIMO);

Or the ACK/NACK response message of the first code word stream of the primary downlink component carriers (or cells) is mapped to the first HARQ-ACK, the ACK/NACK response message of the first code word stream of the first secondary downlink component carrier (or cell) is mapped to the second HARQ-ACK, the ACK/NACK response message of the second code word stream of the first secondary downlink component carrier (or cell) is mapped to the third HARQ-ACK, and the ACK/NACK response message of the first code word stream of the second secondary downlink component carrier (or cell) is mapped to the fourth HARQ-ACK (for example, applicable to the occasions of 3CC, PCC: SIMO, SCC1: MIMO, SCC2: SIMO);

Or the ACK/NACK response message of the first code word stream of the primary downlink component carriers (or cells) is mapped to the first HARQ-ACK, the ACK/NACK response message of the first code word stream of the first secondary downlink component carrier (or cell) is mapped to the second HARQ-ACK, the ACK/NACK response message of the first code word stream of the second secondary downlink component carrier (or cell) is mapped to the third HARQ-ACK, and the ACK/NACK response message of the second code word stream of the first secondary downlink component carrier (or cell) is mapped to the fourth HARQ-ACK (for example, applicable to the occasions of 3CC, PCC: SIMO, SCC1: MIMO, SCC2: SIMO);

Or the ACK/NACK response message of the first code word stream of the primary downlink component carriers (or cells) is mapped to the first HARQ-ACK, the ACK/NACK response message of the first code word stream of the first secondary downlink component carrier (or cell) is mapped to the second HARQ-ACK, the ACK/NACK response message of the first code word stream of the second secondary downlink component carrier (or cell) is mapped to the third HARQ-ACK, and the ACK/NACK response message of the second code word stream of the second secondary downlink component carrier (or cell) is mapped to the fourth HARQ-ACK (for example, applicable to the occasions of 3CC, PCC: SIMO, SCC1: SIMO, SCC2: MIMO);

Or the ACK/NACK response messages of component carriers (or cells) containing two code word streams are respectively mapped to HARQ-ACK(0) and HARQ-ACK(1), and the ACK/NACK response messages of component carriers (or cells) only containing one code word stream are respectively mapped to HARQ-ACK(2) and HARQ-ACK(3);

Or the ACK/NACK response message of the first code word stream of the primary downlink component carriers (or cells) is mapped to the first HARQ-ACK, the ACK/NACK response message of the second code word stream of the primary downlink component carriers (or cells) is mapped to the second HARQ-ACK, the ACK/NACK response message of the first code word stream of the first secondary downlink component carrier (or cell) is mapped to the third HARQ-ACK, and the ACK/NACK response message of the second code word stream of the first secondary downlink component carrier (or cell) is mapped to the fourth HARQ-ACK (for example, applicable to the occasions of 2CC, PCC: MIMO, SCC1: MIMO);

Or the ACK/NACK response message of the first code word stream of the primary downlink component carriers (or cells) is mapped to the first HARQ-ACK, the ACK/NACK response message of the first code word stream of the first secondary downlink component carrier (or cell) is mapped to the second HARQ-ACK, the ACK/NACK response message of the second code word stream of the primary downlink component carriers (or cells) is mapped to the third HARQ-ACK, and the ACK/NACK response message of the second code word stream of the first secondary downlink component carrier (or cell) is mapped to the fourth HARQ-ACK (for example, applicable to the occasions of 2CC, PCC: MIMO, SCC1: MIMO).

In the FDD system, one feature of the channel selection is that it does not have spatial bundling, while in the TDD system the spatial bundling should be conducted, otherwise it cannot be used.

In a TDD system, for a channel selection mapping table in which M=2, the ACK/NACK response message of the first code word stream of the primary downlink component carriers (or cells), or the result of the ACK/NACK response messages of a first code word stream and a second code word stream of the primary downlink component carriers (or cells) subjected to logical AND is mapped to the first HARQ-ACK, and the ACK/NACK response message of the first code word stream of the secondary downlink component carriers (or cells), or the result of the ACK/NACK response messages of a first code word stream and a second code word stream of the secondary downlink component carriers (or cells) subjected to logical AND is mapped to the second HARQ-ACK (for example, applicable to the occasion of 2CC and one subframe corresponding to one downlink subframe).

For a channel selection mapping table in which M=3, the ACK/NACK response message of the first code word stream of the primary downlink component carriers (or cells), or the result of the ACK/NACK response messages of a first code word stream and a second code word stream of the primary downlink component carriers (or cells) subjected to logical AND is mapped to the first HARQ-ACK, and the ACK/NACK response message of the first code word stream of a first secondary downlink component carrier (or cell), or the result of the ACK/NACK response messages of a first code word stream and a second code word stream of the first secondary downlink component carrier (or cell) subjected to logical AND is mapped to the second HARQ-ACK; and the ACK/NACK response message of the first code word stream of a second secondary downlink component carrier (or cell), or the result of the ACK/NACK response messages of a first code word stream and a second code word stream of the second secondary downlink component carrier (or cell) subjected to logical AND is mapped to the third HARQ-ACK (for example, applicable to the occasion of 3CC and one subframe corresponding to one downlink subframe).

For a channel selection mapping table in which M=4, the ACK/NACK response message of the first code word stream of the primary downlink component carriers (or cells), or the result of the ACK/NACK response messages of a first code word stream and a second code word stream of the primary downlink component carriers (or cells) subjected to logical AND is mapped to the first HARQ-ACK, and the ACK/NACK response message of the first code word stream of the first secondary downlink component carrier (or cell), or the result of the ACK/NACK response messages of a first code word stream and a second code word stream of the first secondary downlink component carrier (or cell) subjected to logical AND is mapped to the second HARQ-ACK; the ACK/NACK response message of the first code word stream of the second secondary downlink component carrier (or cell), or the result of the ACK/NACK response messages of a first code word stream and a second code word stream of the second secondary downlink component carrier (or cell) subjected to logical AND is mapped to the third HARQ-ACK; the ACK/NACK response message of the first code word stream of the third secondary downlink component carrier (or cell), or the result of the ACK/NACK response messages of a first code word stream and a second code word stream of the third secondary downlink component carrier (or cell) subjected to logical AND is mapped to the fourth HARQ-ACK (for example, applicable to the occasion of 4CC and one subframe corresponding to one downlink subframe);

Or the ACK/NACK response message of the first code word stream of the primary downlink component carriers (or cells) at a first subframe, or the result of the ACK/NACK response messages of a first code word stream and a second code word stream of the primary downlink component carriers (or cells) at the first subframe subjected to logical AND is mapped to the first HARQ-ACK, the ACK/NACK response message of the first code word stream of the secondary downlink component carriers (or cells) at a first subframe, or the result of the ACK/NACK response messages of a first code word stream and a second code word stream of the secondary downlink component carriers (or cells) at the first subframe subjected to logical AND is mapped to the second HARQ-ACK, the ACK/NACK response message of the first code word stream of the primary downlink component carriers (or cells) at a second subframe, or the result of the ACK/NACK response messages of a first code word stream and a second code word stream of the primary downlink component carriers (or cells) at the second subframe subjected to logical AND is mapped to the third HARQ-ACK, and the ACK/NACK response message of the first code word stream of the secondary downlink component carriers (or cells) at a second subframe, or the result of the ACK/NACK response messages of a first code word stream and a second code word stream of the secondary downlink component carriers (or cells) at the second subframe subjected to logical AND is mapped to the fourth HARQ-ACK (for example, applicable to the occasion of 2CC and two subframes and the occasion of CC first and then the subframe);

Or the ACK/NACK response message of the first code word stream of the primary downlink component carriers (or cells) at a first subframe, or the result of the ACK/NACK response messages of a first code word stream and a second code word stream of the primary downlink component carriers (or cells) at the first subframe subjected to logical AND is mapped to the first HARQ-ACK, the ACK/NACK response message of the first code word stream of the primary downlink component carriers (or cells) at a second subframe, or the result of the ACK/NACK response messages of a first code word stream and a second code word stream of the primary downlink component carriers (or cells) at the second subframe subjected to logical AND is mapped to the second HARQ-ACK, the ACK/NACK response message of the first code word stream of the secondary downlink component carriers (or cells) at a first subframe, or the result of the ACK/NACK response messages of a first code word stream and a second code word stream of the secondary downlink component carriers (or cells) at the first subframe subjected to logical AND is mapped to the third HARQ-ACK, and the ACK/NACK response message of the first code word stream of the secondary downlink component carriers (or cells) at a second subframe, or the result of the ACK/NACK response messages of a first code word stream and a second code word stream of the secondary downlink component carriers (or cells) at the second subframe subjected to logical AND is mapped to the fourth HARQ-ACK (for example, applicable to the occasion of 2CC and two subframes and the occasion of subframe first and then CC).

For the above preferred embodiments, the secondary downlink component carriers (or cells) can be sorted according to a predefined order, thus the first secondary downlink component carrier (or cell), the second secondary downlink component carrier (or cell) and the third secondary downlink component carrier (or cell) are obtained. For example, the predefined order can be obtained according to an carrier index or according to the value of a carrier index field CIF when cross-carrier scheduling is enabled.

The preferred embodiments will be described hereinafter in conjunction with the accompanying drawings.

Preferred Embodiment 7

Figure 10:
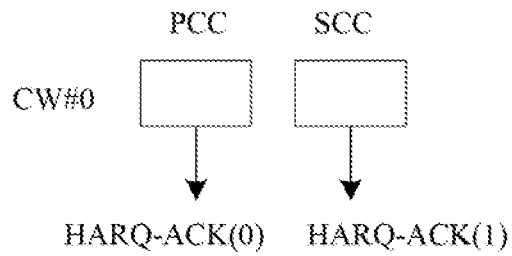
FIG. 10 is another schematic view of the mapping method for ACK/NACK response messages in a TDD system according to an embodiment of the present invention.

As shown in FIG. 10, in the FDD system, when the base station has configured that the UE uses PUCCH format 1*b* with channel selection to feed back the ACK/NACK response messages, suppose the base station configures DL PCC and SCC to the UE, and both are single code word stream transmission modes, then the UE uses the mapping table of M=2 to feed back the ACK/NACK response messages during the feedback, the ACK/NACK response message of the first code word stream of PCC is mapped to HARQ-ACK(0), and the ACK/NACK response message of the first code word stream of SCC is mapped to HARQ-ACK(1).

Preferred Embodiment 8

Figure 11:
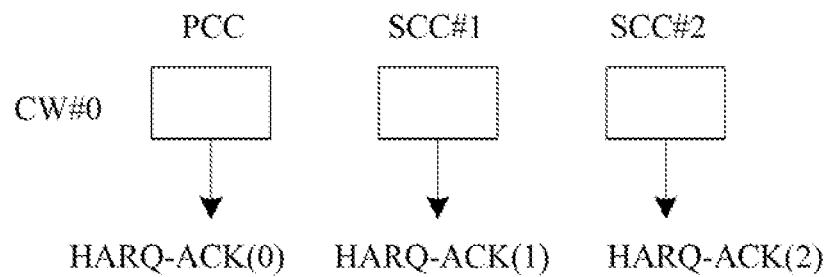
FIG. 11 is another schematic view of the mapping method for ACK/NACK response messages in a TDD system according to an embodiment of the present invention.

As shown in FIG. 11, in the FDD system, when the base station has configured that the UE uses PUCCH format 1b with channel selection to feed back the ACK/NACK response messages, suppose the base station configures DL PCC, SCC#1 and SCC#2 to the UE, and all of them are single code word stream transmission modes, then the UE uses the mapping table of M=3 to feed back the ACK/NACK response messages during the feedback, the ACK/NACK response message of the first code word stream of PCC is mapped to HARQ-ACK(0), the ACK/NACK response message of the first code word stream of SCC#1 is mapped to HARQ-ACK(1), and the ACK/NACK response message of the first code word stream of SCC#2 is mapped to HARQ-ACK(2).

Wherein, the two secondary downlink component carriers are sorted according to the order of the carrier indexes, thus the first secondary downlink component carrier (or cell) SCC#1 and the second secondary downlink component carrier (or cell) SCC#2 are obtained.

Preferred Embodiment 9

Figure 12:
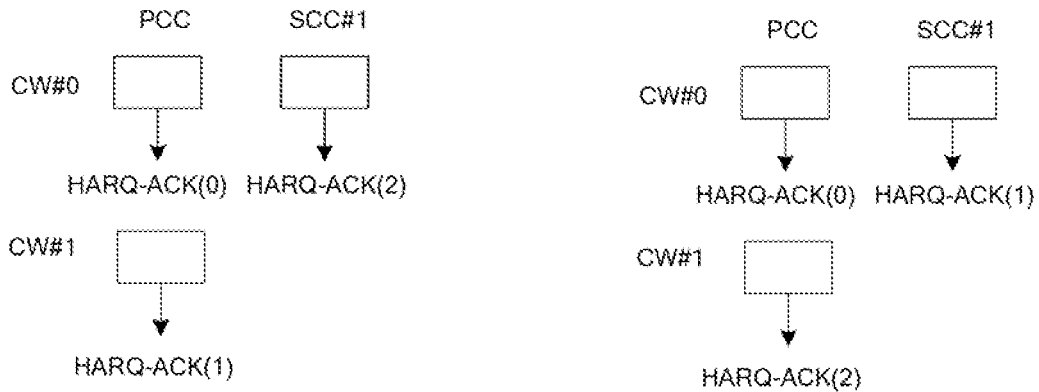
FIG. 12 is another schematic view of the mapping method for ACK/NACK response messages in a TDD system according to an embodiment of the present invention.

As shown in FIG. 12, in the FDD system, when the base station has configured that the UE uses PUCCH format 1b with channel selection to feed back the ACK/NACK response messages, suppose the base station configures DL PCC and SCC to the UE, wherein PCC is a double code word stream transmission mode, and SCC is a single code word stream transmission mode, then the UE will use the mapping table of M=3 to feed back the ACK/NACK response messages during the feedback, the ACK/NACK response message of the first code word stream of PCC is mapped to HARQ-ACK(0), the ACK/NACK response message of the second code word stream of PCC is mapped to HARQ-ACK(1), and the ACK/NACK response message of the first code word stream of SCC is mapped to HARQ-ACK(2);

Or the ACK/NACK response message of the first code word stream of PCC is mapped to HARQ-ACK(0), the ACK/NACK response message of the first code word stream of SCC is mapped to HARQ-ACK(1), and the ACK/NACK response message of the second code word stream of PCC is mapped to HARQ-ACK(2).

Preferred Embodiment 10

Figure 13:
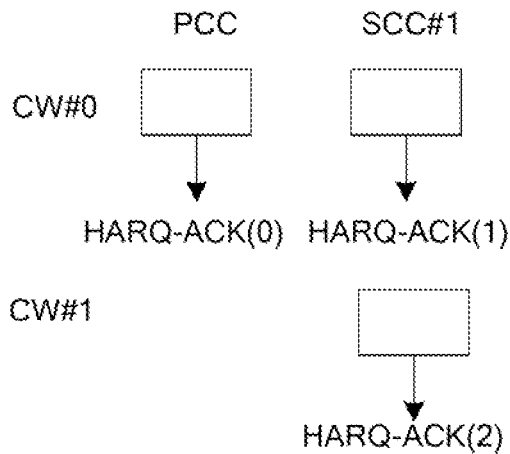
FIG. 13 is another schematic view of the mapping method for ACK/NACK response messages in a TDD system according to an embodiment of the present invention.

As shown in FIG. 13, in the FDD system, when the base station has configured that the UE uses PUCCH format 1b with channel selection to feed back the ACK/NACK response messages, suppose the base station configures DL PCC and SCC to the UE, wherein PCC is a single code word stream transmission mode, and SCC is a double code word stream transmission mode, then the UE will use the mapping table of M=3 to feed back the ACK/NACK response messages during the feedback, the ACK/NACK response message of the first code word stream of PCC is mapped to HARQ-ACK(0), the ACK/NACK response message of the first code word stream of SCC is mapped to HARQ-ACK(1), and the ACK/NACK response message of the second code word stream of SCC is mapped to HARQ-ACK(2).

Preferred Embodiment 11

Figure 14:
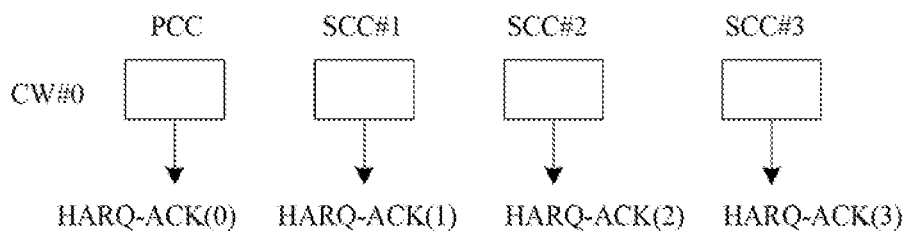
FIG. 14 is another schematic view of the mapping method for ACK/NACK response messages in a TDD system according to an embodiment of the present invention.

As shown in FIG. 14, in the FDD system, when the base station has configured that the UE uses PUCCH format 1b with channel selection to feed back the ACK/NACK response messages, suppose the base station configures DL PCC, SCC#1, SCC#2 and SCC#3 to the UE, and all of them are single code word stream transmission modes, then the UE will use the mapping table of M=4 to feed back the ACK/NACK response messages during the feedback, the ACK/NACK response message of the first code word stream of PCC is mapped to HARQ-ACK(0), the ACK/NACK response message of the first code word stream of SCC#1 is mapped to HARQ-ACK(1), the ACK/NACK response message of the second code word stream of SCC#2 is mapped to HARQ-ACK(2), and the ACK/NACK response message of the second code word stream of SCC#3 is mapped to HARQ-ACK(3).

Wherein the three secondary downlink component carriers are sorted according to the order of the carrier indexes, thus the first secondary downlink component carrier (or cell) SCC#1, the second secondary downlink component carrier (or cell) SCC#2 and the third secondary downlink component carrier (or cell) SCC#3 are obtained.

Preferred Embodiment 12

Figure 15:
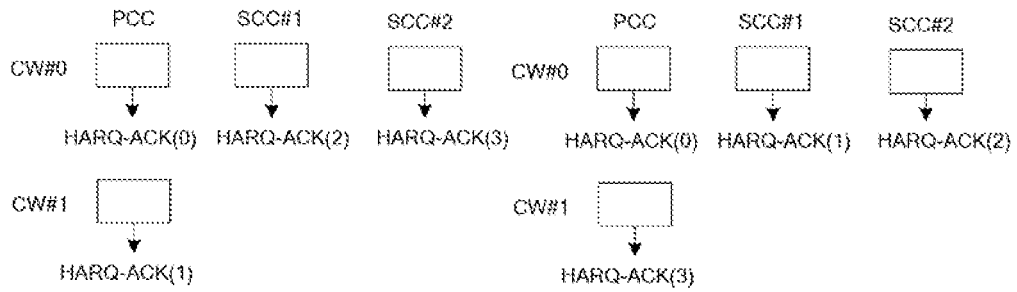
FIG. 15 is another schematic view of the mapping method for ACK/NACK response messages in a TDD system according to an embodiment of the present invention.

As shown in FIG. 15, in the FDD system, when the base station has configured that the UE uses PUCCH format 1b with channel selection to feed back the ACK/NACK response messages, suppose the base station configures DL PCC, SCC#1 and SCC#2 to the UE, wherein PCC is a double code word stream transmission mode, and SCC#1 and SCC#2 are single code word stream transmission modes, then the UE will use the mapping table of M=4 to feed back the ACK/NACK response messages during the feedback, the ACK/NACK response message of the first code word stream of PCC is mapped to HARQ-ACK(O), the ACK/NACK response message of the second code word stream of PCC is mapped to HARQ-ACK(1), the ACK/NACK response message of the first code word stream of SCC#1 is mapped to HARQ-ACK(2), and the ACK/NACK response message of the first code word stream of SCC#2 is mapped to HARQ-ACK(3);

Or the ACK/NACK response message of the first code word stream of PCC is mapped to HARQ-ACK(0), the ACK/NACK response message of the first code word stream of SCC#1 is mapped to HARQ-ACK(1), the ACK/NACK response message of the first code word stream of SCC#2 is mapped to HARQ-ACK(2), and the ACK/NACK response message of the second code word stream of PCC is mapped to HARQ-ACK(3);

Wherein, the two secondary downlink component carriers are sorted according to the order of the carrier indexes, thus the first secondary downlink component carrier (or cell) SCC#1 and the second secondary downlink component carrier (or cell) SCC#2 are obtained.

Preferred Embodiment 13

Figure 16:
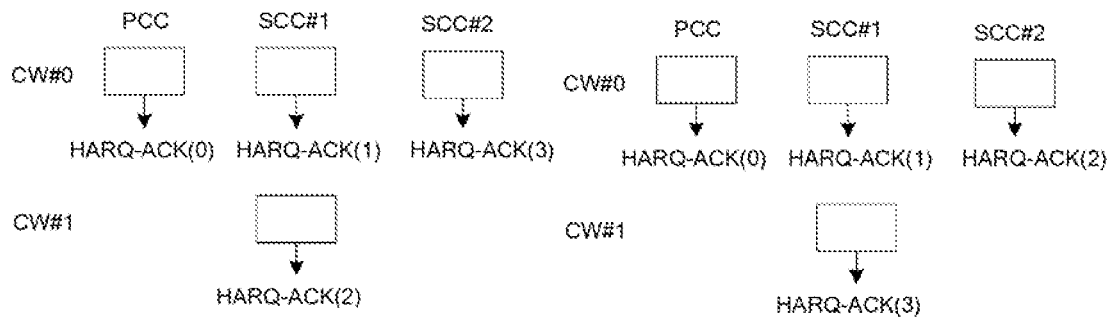
FIG. 16 is another schematic view of the mapping method for ACK/NACK response messages in a TDD system according to an embodiment of the present invention.

As shown in FIG. 16, in the FDD system, when the base station has configured that the UE uses PUCCH format 1b with channel selection to feed back the ACK/NACK response messages, suppose the base station configures DL PCC, SCC#1 and SCC#2 to the UE, wherein PCC is a single code word stream transmission mode, and SCC#1 is a double code word stream transmission mode, and SCC#2 are a single code word stream transmission mode, then the UE will use the mapping table of M=4 to feed back the ACK/NACK response messages during the feedback, the ACK/NACK response message of the first code word stream of PCC is mapped to HARQ-ACK(0), the ACK/NACK response message of the first code word stream of SCC#1 is mapped to HARQ-ACK (1), the ACK/NACK response message of the second code word stream of SCC#1 is mapped to HARQ-ACK(2), and the ACK/NACK response message of the first code word stream of SCC#2 is mapped to HARQ-ACK(3);

Or the ACK/NACK response message of the first code word stream of PCC is mapped to HARQ-ACK(0), the ACK/NACK response message of the first code word stream of SCC#1 is mapped to HARQ-ACK(1), the ACK/NACK response message of the first code word stream of SCC#2 is mapped to HARQ-ACK(2), and the ACK/NACK response message of the second code word stream of SCC#1 is mapped to HARQ-ACK(3);

Wherein, the two secondary downlink component carriers are sorted according to the order of the carrier indexes, thus the first secondary downlink component carrier (or cell) SCC#1 and the second secondary downlink component carrier (or cell) SCC#2 are obtained.

Preferred Embodiment 14

Figure 17:
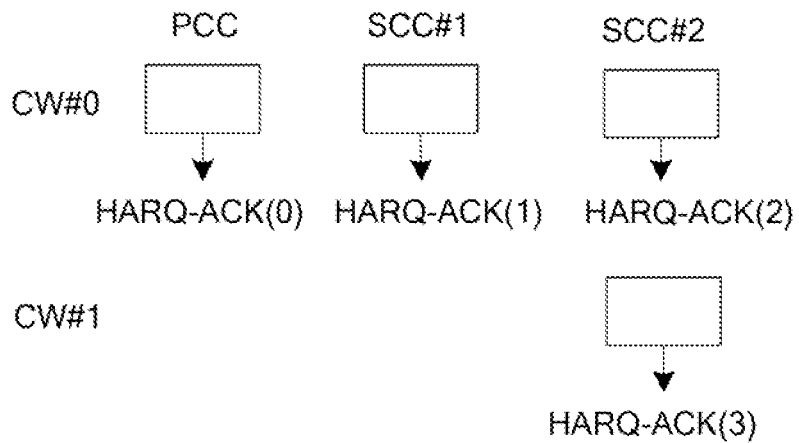
FIG. 17 is another schematic view of the mapping method for ACK/NACK response messages in a TDD system according to an embodiment of the present invention.

As shown in FIG. 17, in the FDD system, when the base station has configured that the UE uses PUCCH format 1*b* with channel selection to feed back the ACK/NACK response messages, suppose the base station configures DL PCC, SCC#1 and SCC#2 to the UE, wherein PCC is a single code word stream transmission mode, SCC#1 is a single code word stream transmission mode, and SCC#2 are a double code word stream transmission mode, then the UE will use the mapping table of M=4 to feed back the ACK/NACK response messages during the feedback, the ACK/NACK response message of the first code word stream of PCC is mapped to HARQ-ACK(0), the ACK/NACK response message of the first code word stream of SCC#1 is mapped to HARQ-ACK (1), the ACK/NACK response message of the first code word stream of SCC#2 is mapped to HARQ-ACK(2), and the ACK/NACK response message of the second code word stream of SCC#2 is mapped to HARQ-ACK(3);

Wherein, the two secondary downlink component carriers are sorted according to the order of the carrier indexes, thus the first secondary downlink component carrier (or cell) SCC#1 and the second secondary downlink component carrier (or cell) SCC#2 are obtained.

Preferred Embodiment 15

Figure 18:
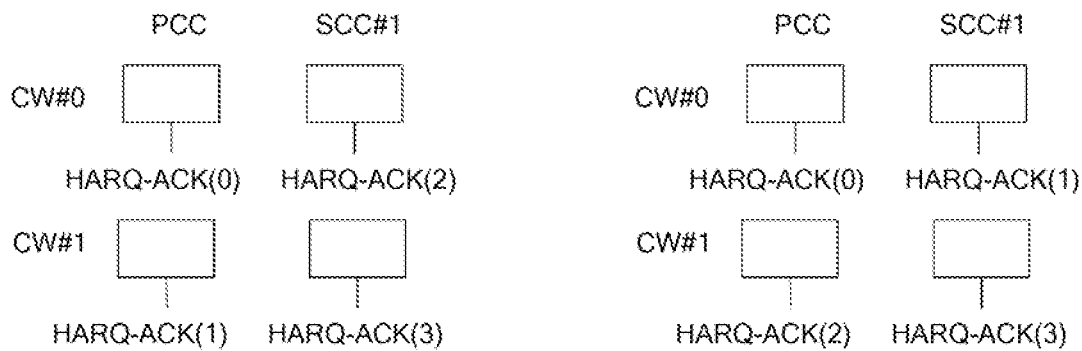
FIG. 18 is another schematic view of the mapping method for ACK/NACK response messages in a TDD system according to an embodiment of the present invention.

As shown in FIG. 18, in the FDD system, when the base station has configured that the UE uses PUCCH format 1*b* with channel selection to feed back the ACK/NACK response messages, suppose the base station configures DL PCC and SCC to the UE, wherein PCC and SCC are both double code word stream transmission mode, then the UE will use the mapping table of M=4 to feed back the ACK/NACK response messages during the feedback, the ACK/NACK response message of the first code word stream of PCC is mapped to HARQ-ACK(0), the ACK/NACK response message of the second code word stream of PCC is mapped to HARQ-ACK (1), the ACK/NACK response message of the first code word stream of SCC is mapped to HARQ-ACK(2), and the ACK/NACK response message of the second code word stream of SCC is mapped to HARQ-ACK(3);

Or the ACK/NACK response message of the first code word stream of PCC is mapped to HARQ-ACK(0), the ACK/NACK response message of the first code word stream of SCC is mapped to HARQ-ACK(1), the ACK/NACK response message of the second code word stream of PCC is mapped to HARQ-ACK(2), and the ACK/NACK response message of the second code word stream of SCC is mapped to HARQ-ACK(3).

Preferred Embodiment 16

Figure 19:
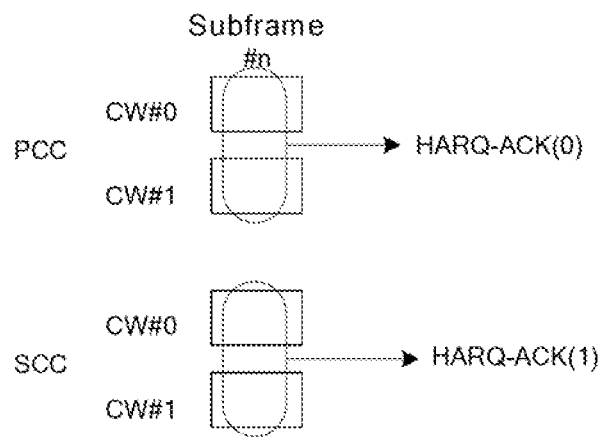
FIG. 19 is another schematic view of the mapping method for ACK/NACK response messages in a TDD system according to an embodiment of the present invention.

As shown in FIG. 19, in the TDD system, when the base station has configured that the UE uses PUCCH format 1*b* with channel selection to feed back the ACK/NACK response messages, suppose the base station configures DL PCC and SCC to the UE, and a certain uplink subframe only corresponds to one downlink subframe, then the UE will use the mapping table of M=2 to feed back the ACK/NACK response messages during the feedback, the ACK/NACK response message of the first code word stream of the PCC or the result of the ACK/NACK response messages of a first code word stream and a second code word stream of the PCC subjected to logical AND is mapped to HARQ-ACK(O), and the ACK/NACK response message of the first code word stream of SCC or the result of the ACK/NACK response messages of a first code word stream and a second code word stream of SCC subjected to logical AND is mapped to HARQ-ACK(1).

Preferred Embodiment 17

Figure 20:
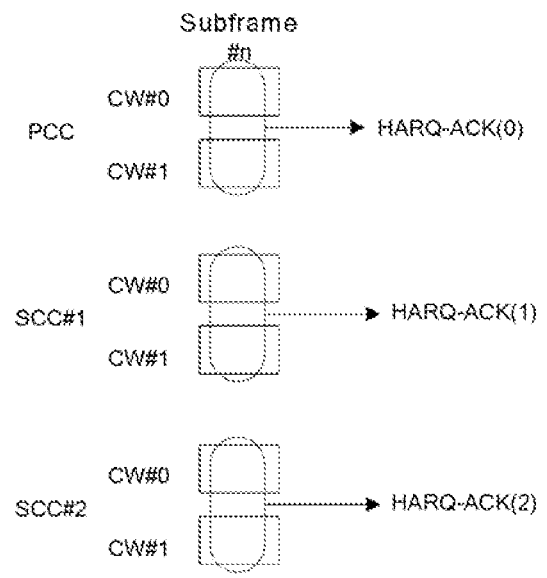
FIG. 20 is another schematic view of the mapping method for ACK/NACK response messages in a TDD system according to an embodiment of the present invention.

As shown in FIG. 20, in the TDD system, when the base station has configured that the UE uses PUCCH format 1*b* with channel selection to feed back the ACK/NACK response messages, suppose the base station configures DL PCC and SCC#1 and #2 to the UE, and a certain uplink subframe only corresponds to one downlink subframe, then the UE will use the mapping table of M=3 to feed back the ACK/NACK response messages during the feedback, the ACK/NACK response message of the first code word stream of PCC or the result of the ACK/NACK response messages of a first code word stream and a second code word stream of PCC subjected to logical AND is mapped to HARQ-ACK(O), the ACK/NACK response message of the first code word stream of SCC#1 or the result of the ACK/NACK response messages of a first code word stream and a second code word stream of SCC#1 subjected to logical AND is mapped to HARQ-ACK (1), the ACK/NACK response message of the first code word stream of SCC#2 or the result of the ACK/NACK response messages of a first code word stream and a second code word stream of SCC#2 subjected to logical AND is mapped to HARQ-ACK(2);

Wherein, the two secondary downlink component carriers are sorted according to the order of the carrier indexes, thus the first secondary downlink component carrier (or cell) SCC#1 and the second secondary downlink component carrier (or cell) SCC#2 are obtained.

Preferred Embodiment 18

Figure 21:
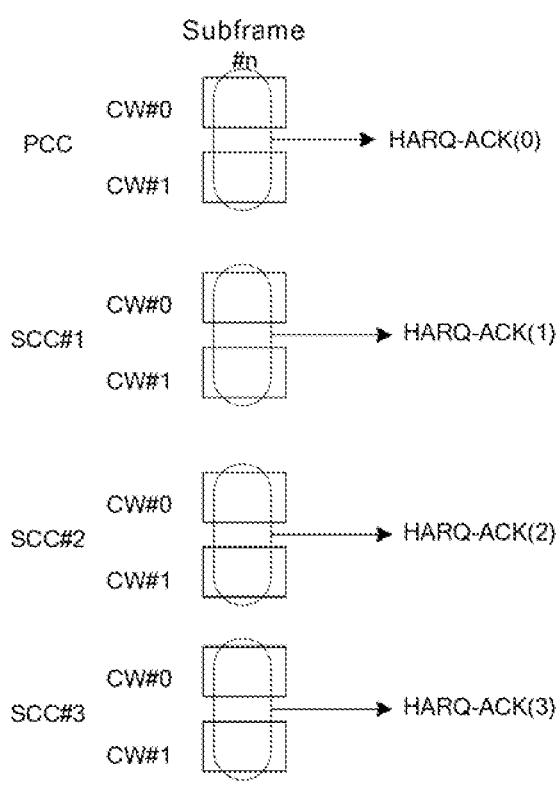
FIG. 21 is another schematic view of the mapping method for ACK/NACK response messages in a TDD system according to an embodiment of the present invention.

As shown in FIG. 21, in the TDD system, when the base station has configured that the UE uses PUCCH format 1*b* with channel selection to feed back the ACK/NACK response messages, suppose the base station configures DL PCC and SCC#1, #2 and #3 to the UE, and a certain uplink subframe only corresponds to one downlink subframe, then the UE will use the mapping table of M=4 to feed back the ACK/NACK response messages during the feedback, the ACK/NACK response message of the first code word stream of PCC or the result of the ACK/NACK response messages of a first code word stream and a second code word stream of PCC subjected to logical AND is mapped to HARQ-ACK(0), the ACK/NACK response message of the first code word stream of SCC#1 or the result of the ACK/NACK response messages of a first code word stream and a second code word stream of SCC#1 subjected to logical AND is mapped to HARQ-ACK (1), the ACK/NACK response message of the first code word stream of SCC#2 or the result of the ACK/NACK response messages of a first code word stream and a second code word stream of SCC#2 subjected to logical AND is mapped to HARQ-ACK(2); the ACK/NACK response message of the first code word stream of SCC#3 or the result of the ACK/NACK response messages of a first code word stream and a second code word stream of SCC#3 subjected to logical AND is mapped to HARQ-ACK(3);

Wherein, the three secondary downlink component carriers are sorted according to the order of the carrier indexes, thus the first secondary downlink component carrier (or cell) SCC#1, the second secondary downlink component carrier (or cell) SCC#2 and the third secondary downlink component carrier (or cell) SCC#3 are obtained.

Preferred Embodiment 19

Figure 22:
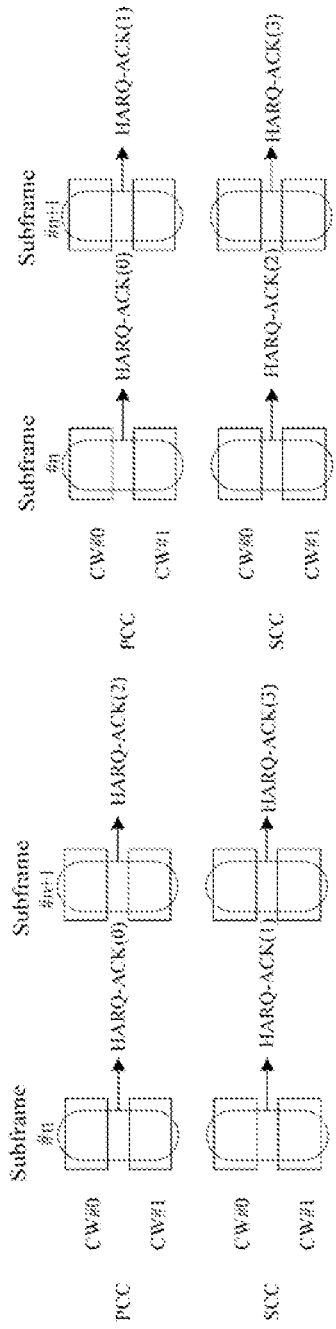
FIG. 22 is another schematic view of the mapping method for ACK/NACK response messages in a TDD system according to an embodiment of the present invention.

As shown in FIG. 22, in the TDD system, when the base station has configured that the UE uses PUCCH format 1b with channel selection to feed back the ACK/NACK response messages, suppose the base station configures DL PCC and SCC to the UE, and a certain uplink subframe only corresponds to two downlink subframes, then the UE will use the mapping table of M=4 to feed back the ACK/NACK response messages during the feedback, the ACK/NACK response message of the first code word stream of PCC at a first subframe, or the result of the ACK/NACK response messages of a first code word stream and a second code word stream of PCC at the first subframe subjected to logical AND is mapped to the first HARQ-ACK(0), the ACK/NACK response message of the first code word stream of SCC at a first subframe, or the result of the ACK/NACK response messages of a first code word stream and a second code word stream of SCC at the first subframe subjected to logical AND is mapped to the first HARQ-ACK (1), the ACK/NACK response message of the first code word stream of PCC at a second subframe, or the result of the ACK/NACK response messages of a first code word stream and a second code word stream of PCC at the second subframe subjected to logical AND is mapped to the first HARQ-ACK(2), and the ACK/NACK response message of the first code word stream of SCC at a second subframe, or the result of the ACK/NACK response messages of a first code word stream and a second code word stream of SCC at the second subframe subjected to logical AND is mapped to the first HARQ-ACK(3);

Or the ACK/NACK response message of the first code word stream of PCC at a first subframe, or the result of the ACK/NACK response messages of a first code word stream and a second code word stream of PCC at the first subframe subjected to logical AND is mapped to the first HARQ-ACK (0), the ACK/NACK response message of the first code word stream of PCC at a second subframe, or the result of the ACK/NACK response messages of a first code word stream and a second code word stream of PCC at the second subframe subjected to logical AND is mapped to the first HARQ-ACK(1), the ACK/NACK response message of the first code word stream of SCC at a first subframe, or the result of the ACK/NACK response messages of a first code word stream and a second code word stream of SCC at the first subframe subjected to logical AND is mapped to the first HARQ-ACK (2), and the ACK/NACK response message of the first code word stream of SCC at a second subframe, or the result of the ACK/NACK response messages of a first code word stream and a second code word stream of SCC at the second subframe subjected to logical AND is mapped to the fourth HARQ-ACK(3).

A UE is further provided in another embodiment, and is configured to realize the above embodiments and their preferred embodiments. Those which have been described will not be described any more, and only the modules of the UE will be described hereinafter.

Figure 23:
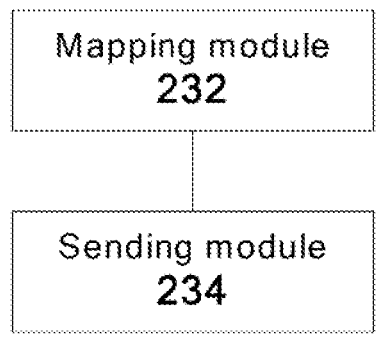
FIG. 23 is a block diagram of the structure of another UE according to an embodiment of the present invention.

FIG. 23 is a block diagram of the structure of another UE according to the embodiment of the present invention, and as shown in FIG. 23, the UE comprises a mapping module 232 and a sending module 234, and the structure will be described as follow.

The mapping module 232 is configured to ACK/NACK response messages corresponding to code word streams to a channel selection mapping table according to at least one of: whether a downlink component carrier or cell is a primary or secondary one, a sequence of the code word streams of the downlink component carrier or cell and a number of the code word streams contained in the downlink component carrier or cell; and the sending module 234 is connected to the mapping module 232 and configured to send the ACK/NACK response messages using a PUCCH format 1b channel selection.

Owing to the above discussion, the problem in the prior art that the base station may incorrectly understand the ACK/NACK response messages fed back by the UE and thus error is incurred is solved via the above embodiments, and thus the ACK/NACK response messages can be correctly processed.

Obviously, one skilled in the art shall understand that various modules and steps described above can be realized with general computing devices and can be integrated into one single computing device or distributed within a network consisting of multiple computing devices, and alternatively, they can be realized with the program codes executable by the computing devices, and thus can be stored in memory devices so as to be executed by the computing devices, and in some situations, the illustrated or described steps can be executed in an order different from that herein, or they can be formed into individual integrated circuit modules, or a plurality of the modules or steps can be formed into a single integrated circuit module for implementation. Therefore, the present invention is not limited to any particular hardware or software combination.

The descriptions above are only preferred embodiments of the present invention, which are not intended to restrict the present invention. For those skilled in the art, the present invention may have various changes and variations. Any modifications, equivalent substitutions, improvements and etc. within the spirit and principle of the present invention shall all be included in the scope of protection of the present invention.

What is claimed is:

1. A method for mapping acknowledgement/negative acknowledgement (ACK/NACK) response messages, comprising:

a user equipment (UE) determining a number L of bits of ACK/NACK response messages that need to be fed back according to predetermined conditions, wherein, the predetermined conditions include at least one of: a number of downlink component carriers or cells that are configured to the UE by a base station, and a transmission mode of each of the downlink component carriers; and the UE mapping the ACK/NACK response messages to the L bits according to at least one of: whether a downlink component carrier or cell is a primary or secondary one, an order of the code word streams of the downlink component carrier or cell and a number of the code word streams contained in the downlink component carrier or cell, and the L bits are processed by channel coding, scrambling, modulating, transform precoding, and time domain spreading, and then sent on a PUCCH format in form of DFT-s-OFDM; or, the L bits are processed by channel coding and channel interleaving and then multiplexed with data and sent to the base station in a PUSCH, and if the UE is unable to detect a PDSCH in a code word stream corresponding to a downlink component carrier or cell configured for the UE, the UE will generate a NACK response message for the downlink component carrier or cell.

2. The method according to claim 1, wherein, in a frequency division duplex (FDD) system, the UE determines the number L of the bits of the ACK/NACK response messages that need to be fed back, according to the number of the downlink component carriers or cells that the base station configured for the UE and the transmission mode of each of the downlink component carriers; and the UE maps the ACK/NACK response messages to the L bits according to an order that code word streams are with priority to downlink component carriers or cells, or according to an order that the downlink component carriers or cells are with priority to the code word streams, wherein when the UE maps the ACK/NACK response messages to the L bits according to the downlink component carriers or cells, primary downlink component carriers or cells are firstly mapped by the UE, and then secondary downlink component carriers or cells are mapped by the UE; or the UE maps according to an index of a respective downlink component carrier or cell.

3. The method according to claim 1, wherein, the bit number $$L = \sum_{i=0}^{M-1} x_i,$$

i=0, 1, . . . , M−1, wherein, M is a number of the downlink component carriers or cells that the base station configured for the UE, $x_i$ is a number of bits of the ACK/NACK response messages required by the transmission mode of a respective downlink component carrier or cell allocated for the UE, and $x_i$ is 1 if the transmission mode of a downlink component carrier contains 1 code word stream, and $x_i$ is 2 if the transmission mode of the downlink component carriers contains 2 code word streams.

4. The method according to claim 1, wherein, in a time division duplex (TDD) system, the UE determines the number L of the bits of the ACK/NACK response messages that need to be fed back, according to the number of the downlink component carriers or cells that the base station configured for the UE, a ratio of uplink subframes and downlink subframes configured for the UE and the transmission mode of each of the downlink component carriers; and the UE maps the ACK/NACK response messages to the L bits according to an order that code word streams are with priority to downlink component carriers or cells and the downlink component carriers or cells are with priority to subframes, or an order that the code word streams are with priority to the subframes, and the subframes are priority to the component carriers (or cells), wherein when the UE maps the ACK/NACK response messages to the L bits according to the downlink component carriers or cells, primary downlink component carriers or cells are firstly mapped by the UE, and then secondary downlink component carriers or cells are mapped by the UE; or, the UE maps according to an index of a respective downlink component carrier or cell, and wherein when the UE maps the ACK/NACK response messages to the L bits according to the subframes, the UE maps in a sequential order of the subframes.

5. The method according to claim 1, wherein, in a TDD system, when the base station configures the UE to perform a logical AND operation on the ACK/NACK response messages associated with code word streams by higher layer signaling, the UE determines the number L of the bits of the ACK/NACK response messages that need to be fed back, according to the number of the downlink component carriers or cells configured for the UE and a ratio of uplink subframes and downlink subframes allocated for the UE; and the UE maps the ACK/NACK response messages to the L bits according to either an order that downlink component carriers or cells are with priority to subframes, or according to an order that the subframes are with priority to the downlink component carriers or cells, wherein when the UE maps the ACK/NACK response messages to the L bits according to the downlink component carriers or cells, primary downlink component carriers or cells are firstly mapped by the UE, and then secondary downlink component carriers or cells are mapped by the UE; or the UE maps according to an index of a respective downlink component carrier or cell, and wherein when the UE maps the ACK/NACK response messages to the L bits according to the subframes, the UE maps in a sequential order of the subframes.

6. The method according to claim 1, wherein, in a TDD system, when the base station configures the UE to perform a logical AND operation on the ACK/NACK response messages associated with code word streams by higher layer signaling, the UE determines the number L of the bits of the ACK/NACK response messages that need to be fed back, according to the number of the downlink component carriers or cells configured for the UE and a ratio of uplink subframes and downlink subframes configured for the UE; and when downlink assignment information (DAT) within downlink control information (DCI) of the base station represents that the number of PDCCHs is accumulated according to an order that component carriers are with priority to subframes, the UE maps the ACK/NACK response messages to the corresponding bit positions according to the DAI.

7. A method for mapping ACK/NACK response messages, comprising:

a UE mapping ACK/NACK response messages corresponding to code word streams to a channel selection mapping table according to at least one of: whether a downlink component carrier or cell is a primary or secondary one, an order of the code word streams of the downlink component carrier or cell and a number of the code word streams contained in the downlink component carrier or cell, wherein the UE maps the ACK/NACK response messages to the channel selection mapping table, according to the number of downlink component carriers or cells that a base station configures for the UE and a transmission mode of each of the configured downlink component carriers; and the UE sending the ACK/NACK response messages using a PUCCH format 1b with channel selection.

8. The method according to claim 7, wherein, the UE maps the ACK/NACK response messages to the channel selection mapping table, according to whether the downlink component carrier or cell is a primary or secondary downlink component carrier or cell and an order of the code word streams of the downlink component carrier or cell, or the number of the code word streams contained in the downlink component carrier or cell.

9. The method according to claim 8, wherein,
the UE maps the ACK/NACK response messages to the channel selection mapping table according to an order that primary downlink component carriers or cells are with priority to secondary downlink carriers or cells, or according to a decreasing order defined by the number of the code word streams contained in the downlink component carrier or cell.

10. The method according to claim 8, wherein, for a channel selection mapping table with M=2,
when the UE is in an FDD system, the ACK/NACK response message of the first code word stream of the primary downlink component carriers or cells is mapped to a first HARQ-ACK, and the ACK/NACK response message of the first code word stream of the secondary downlink component carriers or cells is mapped to a second HARQ-ACK;
when the UE is in a TDD system, the ACK/NACK response message of the first code word stream of the primary downlink component carriers or cells, or the logical AND result of the ACK/NACK response messages of a first code word stream and a second code word stream of the primary downlink component carriers or cells is mapped to a first HARQ-ACK, and the ACK/NACK response message of the first code word stream of the secondary downlink component carriers or cells, or the logical AND result of the ACK/NACK response messages of a first code word stream and a second code word stream of the secondary downlink component carriers or cells is mapped to a second HARQ-ACK.

11. The method according to claim 8, wherein, for a channel selection mapping table with M=3,
when the UE is in an FDD system, the UE is configured to map ACK/NACK response messages corresponding to code word streams to the channel selection mapping table by way of at least one of the following:
the ACK/NACK response message of the first code word stream of the primary downlink component carriers or cells is mapped to a first HARQ-ACK, the ACK/NACK response message of the first code word stream of a first secondary downlink component carrier or cell is mapped to a second HARQ-ACK, and the ACK/NACK response message of the first code word stream of a second secondary downlink component carrier or cell is mapped to a third HARQ-ACK;
the ACK/NACK response message of the first code word stream of the primary downlink component carriers or cells is mapped to a first HARQ-ACK, the ACK/NACK response message of the second code word stream of the primary downlink component carriers or cells is mapped to a second HARQ-ACK, and the ACK/NACK response message of the first code word stream of the secondary downlink component carriers or cells is mapped to a third HARQ-ACK;
the ACK/NACK response message of the first code word stream of the primary downlink component carriers or cells is mapped to a first HARQ-ACK, the ACK/NACK response message of the first code word stream of the secondary downlink component carriers or cells is mapped to a second HARQ-ACK, and the ACK/NACK response message of the second code word stream of the primary downlink component carriers or cells is mapped to a third HARQ-ACK;
the ACK/NACK response message of the first code word stream of the primary downlink component carriers or cells is mapped to a first HARQ-ACK, the ACK/NACK response message of the first code word stream of the secondary downlink component carriers or cells is mapped to a second HARQ-ACK, and the ACK/NACK response message of the second code word stream of the secondary downlink component carriers or cells is mapped to a third HARQ-ACK;
the ACK/NACK response messages of component carriers or cells containing two code word streams are respectively mapped to a first HARQ-ACK and a second HARQ-ACK, and the ACK/NACK response messages of component carriers or cells only containing one code word stream are mapped to a third HARQ-ACK;
when the UE is in a TDD system, the UE maps ACK/NACK response messages corresponding to code word streams to the channel selection mapping table in the following manners:
the ACK/NACK response message of the first code word stream of the primary downlink component carriers or cells, or the logical AND result of the ACK/NACK response messages of a first code word stream and a second code word stream of the primary downlink component carriers or cells is mapped to a first HARQ-ACK, and the ACK/NACK response message of the first code word stream of a first secondary downlink component carriers or cells, or the logical AND result of the ACK/NACK response messages of a first code word stream and a second code word stream of the first secondary downlink component carriers or cells is mapped to a second HARQ-ACK; and the ACK/NACK response message of the first code word stream of a second secondary downlink component carrier or cell, or the logical AND result of the ACK/NACK response messages of a first code word stream and a second code word stream of the second secondary downlink component carrier or cell is mapped to a third HARQ-ACK, wherein
the secondary downlink component carriers or cells are sorted according to a predefined order; wherein, the predefined order is obtained according to an carrier index or according to the value of a carrier index field CIF when cross-carrier scheduling is enabled.

12. The method according to claim 8, wherein, for a channel selection mapping table in which M=4,
when the UE is in an FDD system, the UE is configured to map ACK/NACK response messages corresponding to code word streams to the channel selection mapping table by way of at least one of the following:
the ACK/NACK response message of the first code word stream of the primary downlink component carriers or cells is mapped to a first HARQ-ACK, and the ACK/NACK response message of the first code word stream of a first secondary downlink component carrier or cell is mapped to a third HARQ-ACK; the ACK/NACK response message of the first code word stream of a second secondary downlink component carrier or cell is mapped to the third HARQ-ACK; the ACK/NACK response message of the first code word stream of a third secondary downlink component carrier or cell is mapped to a fourth HARQ-ACK;

the ACK/NACK response message of the first code word stream of the primary downlink component carriers or cells is mapped to the first HARQ-ACK, the ACK/NACK response message of the second code word stream of the primary downlink component carriers or cells is mapped to a second HARQ-ACK, the ACK/NACK response message of the first code word stream of the first secondary downlink component carriers or cells is mapped to the third HARQ-ACK, and the ACK/NACK response message of the first code word stream of the second secondary downlink component carriers or cells is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the primary downlink component carriers or cells is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the second code word stream of the first secondary downlink component carrier or cell is mapped to the third HARQ-ACK, and the ACK/NACK response message of the first code word stream of the second secondary downlink component carriers (or cells) is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the first secondary downlink component carrier or cell is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the first code word stream of the second secondary downlink component carrier or cell is mapped to the third HARQ-ACK, and the ACK/NACK response message of the second code word stream of the second secondary downlink component carrier or cell is mapped to the fourth HARQ-ACK;

the ACK/NACK response messages of component carriers or cells containing two code word streams are respectively mapped to the first HARQ-ACK and the second HARQ-ACK, and the ACK/NACK response messages of component carriers or cells only containing one code word stream are respectively mapped to the third HARQ-ACK and the fourth HARQ-ACK;

the ACK/NACK response message of the first code word stream of the primary downlink component carriers or cells is mapped to the first HARQ-ACK, the ACK/NACK response message of the second code word stream of the primary downlink component carriers or cells is mapped to the second HARQ-ACK, the ACK/NACK response message of the first code word stream of the first secondary downlink component carrier or cell is mapped to the third HARQ-ACK, and the ACK/NACK response message of the second code word stream of the first secondary downlink component carrier or cell is mapped to the fourth HARQ-ACK;

the ACK/NACK response message of the first code word stream of the primary downlink component carriers or cells is mapped to the first HARQ-ACK, the ACK/NACK response message of the first code word stream of the first secondary downlink component carrier or cell is mapped to the second HARQ-ACK, the ACK/NACK response message of the second code word stream of the primary downlink component carriers or cells is mapped to the third HARQ-ACK, and the ACK/NACK response message of the second code word stream of the first secondary downlink component carrier or cell is mapped to the fourth HARQ-ACK;

when the UE is in a TDD system, the UE maps ACK/NACK response messages corresponding to code word streams to the channel selection mapping table in the following manners:

the ACK/NACK response message of the first code word stream of the primary downlink component carriers or cells, or the logical AND result of the ACK/NACK response messages of a first code word stream and a second code word stream of the primary downlink component carriers or cells is mapped to the first HARQ-ACK, and the ACK/NACK response message of the first code word stream of the first secondary downlink component carrier or cell, or the result of the ACK/NACK response messages of a first code word stream and a second code word stream of the first secondary downlink component carrier or cell subjected to logical AND is mapped to the second HARQ-ACK; the ACK/NACK response message of the first code word stream of the second secondary downlink component carrier or cell, or the result of the ACK/NACK response messages of a first code word stream and a second code word stream of the second secondary downlink component carrier or cell subjected to logical AND is mapped to the third HARQ-ACK; the ACK/NACK response message of the first code word stream of the third secondary downlink component carrier or cell, or the result of the ACK/NACK response messages of a first code word stream and a second code word stream of the third secondary downlink component carrier or cell subjected to logical AND is mapped to the fourth HARQ-ACK;

the ACK/NACK response message of the first code word stream of the primary downlink component carriers or cells at a first subframe, or the result of the ACK/NACK response messages of a first code word stream and a second code word stream of the primary downlink component carriers or cells at the first subframe subjected to logical AND is mapped to the first HARQ-ACK, the ACK/NACK response message of the first code word stream of the secondary downlink component carriers or cells at a first subframe, or the result of the ACK/NACK response messages of a first code word stream and a second code word stream of the secondary downlink component carriers or cells at the first subframe subjected to logical AND is mapped to the second HARQ-ACK, the ACK/NACK response message of the first code word stream of the primary downlink component carriers or cells at a second subframe, or the result of the ACK/NACK response messages of a first code word stream and a second code word stream of the primary downlink component carriers or cells at the second subframe subjected to logical AND is mapped to the third HARQ-ACK, and the ACK/NACK response message of the first code word stream of the secondary downlink component carriers or cells at a second subframe, or the result of the ACK/NACK response messages of a first code word stream and a second code word stream of the secondary downlink component carriers or cells at the second subframe subjected to logical AND is mapped to the fourth HARQ-ACK;

the ACK/NACK response message of the first code word stream of the primary downlink component carriers or cells at a first subframe, or the result of the ACK/NACK response messages of a first code word stream and a second code word stream of the primary downlink component carriers or cells at the first subframe subjected to logical AND is mapped to the first HARQ-ACK, the ACK/NACK response message of the first code word stream of the primary downlink component carriers or cells at a second subframe, or the result of the ACK/NACK response messages of a first code word stream and a second code word stream of the primary downlink component carriers or cells at the second subframe subjected to logical AND is mapped to the second HARQ-ACK, the ACK/NACK response message of the first code word stream of the secondary downlink component carriers or cells at a first subframe, or the result of the ACK/NACK response messages of a first code word stream and a second code word stream of the secondary downlink component carriers or cells at the first subframe subjected to logical AND is mapped to the third HARQ-ACK, and the ACK/NACK response message of the first code word stream of the secondary downlink component carriers or cells at a second subframe, or the result of the ACK/NACK response messages of a first code word stream and a second code word stream of the secondary downlink component carriers or cells at the second subframe subjected to logical AND is mapped to the fourth HARQ-ACK, wherein the secondary downlink component carriers or cells are sorted according to a predefined order; wherein, the predefined order is obtained according to an carrier index or according to the value of a carrier index field CIF when cross-carrier scheduling is enabled.

13. A user equipment, comprising a hardware processor configured to execute software program units, wherein the software program units comprise:
   a determination module, configured to determine a number L of bits of ACK/NACK response messages according to predetermined conditions, wherein, the predetermined conditions include at least one of: a number of downlink component carriers or cells that are allocated to the UE by a base station, and a transmission mode of each of the downlink component carriers;
   a mapping module, configured to map the ACK/NACK response messages to the L bits according to at least one of: whether a downlink component carrier or cell is a primary or secondary one, an order of the code word streams of the downlink component carrier or cell and a number of the code word streams contained in the downlink component carrier or cell; and
   a sending module, configured to, after the L bits are processed by channel coding, scrambling, modulating, transform precoding, and time domain spreading, send the L bits on a PUCCH format in form of DFT-s-OFDM; or configured to, after the L bits are processed by channel coding and channel interleaving and then multiplexed with data, send the L bits to the base station in a PUSCH.

14. A user equipment, comprising a hardware processor configured to execute software program units, wherein the software program units comprise:
   a mapping module configured to map ACK/NACK response messages corresponding to code word streams to a channel selection mapping table according to at least one of: whether a downlink component carrier or cell is a primary or secondary one, a sequence of the code word streams of the downlink component carrier or cell and a number of the code word streams contained in the downlink component carrier or cell, wherein the UE maps the ACK/NACK response messages to the channel selection mapping table, according to the number of downlink component carriers or cells that a base station configures for the UE and a transmission mode of each of the configured downlink component carriers; and
   a sending module configured to send the ACK/NACK response messages using a PUCCH format 1*b* channel selection.

* * * * *